(12) United States Patent
Hu et al.

(10) Patent No.: US 10,921,560 B2
(45) Date of Patent: Feb. 16, 2021

(54) OPTICAL IMAGING LENS ASSEMBLY

(71) Applicant: Zhejiang Sunny Optical Co., Ltd, Ningbo (CN)

(72) Inventors: Yabin Hu, Ningbo (CN); Kaiyuan Zhang, Ningbo (CN); Bo Song, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 150 days.

(21) Appl. No.: 16/224,685

(22) Filed: Dec. 18, 2018

(65) Prior Publication Data

US 2019/0121096 A1 Apr. 25, 2019

Related U.S. Application Data

(63) Continuation of application No. PCT/CN2018/079778, filed on Mar. 21, 2018.

(30) Foreign Application Priority Data

Aug. 21, 2017 (CN) .......................... 2017 1 0719642
Aug. 21, 2017 (CN) ..................... 2017 2 1047412 U

(51) Int. Cl.
*G02B 13/00* (2006.01)
*G02B 9/60* (2006.01)
(Continued)

(52) U.S. Cl.
CPC ........... *G02B 13/0045* (2013.01); *G02B 9/60* (2013.01); *G02B 13/04* (2013.01); *G02B 13/06* (2013.01)

(58) Field of Classification Search
CPC .... G02B 9/60; G02B 13/0045; G02B 13/002; G02B 13/04; G02B 13/06; G02B 3/02; G02B 3/04
(Continued)

(56) References Cited

U.S. PATENT DOCUMENTS

2013/0308209 A1 11/2013 Baba
2015/0062724 A1 3/2015 Yu et al.
(Continued)

FOREIGN PATENT DOCUMENTS

CN 106980171 7/2017
CN 106990508 7/2017
(Continued)

*Primary Examiner* — Marin Pichler
(74) *Attorney, Agent, or Firm* — Hauptman Ham, LLP

(57) ABSTRACT

An optical imaging lens assembly is disclosed. The optical imaging lens assembly includes, sequentially along an optical axis from an object side to an image side, a first lens to a fifth lens. The first lens may have a positive refractive power and a concave object-side surface. The second lens may have a positive or a negative refractive power and a concave object-side surface. The third lens may have a positive or a negative refractive power. The fourth lens may have a positive refractive power and a convex image-side surface. The fifth lens may have a negative refractive power, and an object-side surface of the fifth lens and an image-side surface of the fifth lens may both be concave surfaces. A center thickness CT3 of the third lens on the optical axis and a center thickness CT4 of the fourth lens on the optical axis satisfy: CT3/CT4≥1.5.

16 Claims, 12 Drawing Sheets

(51) Int. Cl.
*G02B 13/06* (2006.01)
*G02B 13/04* (2006.01)

(58) Field of Classification Search
USPC .......................... 359/763, 764, 767, 714, 713
See application file for complete search history.

(56) References Cited

U.S. PATENT DOCUMENTS

| | | |
|---|---|---|
| 2015/0098011 A1 | 4/2015 | Huang |
| 2015/0370038 A1* | 12/2015 | Sun ..................... G02B 13/005 |
| | | 359/757 |
| 2016/0097916 A1* | 4/2016 | Tang ........................ G02B 9/62 |
| | | 359/713 |
| 2017/0023770 A1 | 1/2017 | Teraoka |

FOREIGN PATENT DOCUMENTS

| | | |
|---|---|---|
| CN | 107290843 | 10/2017 |
| CN | 207037206 | 2/2018 |

* cited by examiner

OPTICAL IMAGING LENS ASSEMBLY

CROSS-REFERENCE TO RELATED APPLICATIONS

This application is a continuation of International Application. No. PCT/CN2018/079778, filed on Mar. 21, 2018, which claims the priorities and rights to Chinese Patent Application No. 201710719642.0 and Chinese Patent Application No. 201721047412.6 filed with the China National Intellectual Property Administration (CNIPA) on Aug. 21, 2017. All of the aforementioned applications are hereby incorporated by reference in their entireties.

TECHNICAL FIELD

The present disclosure relates to an optical imaging lens assembly, and more specifically to an optical imaging lens assembly including five lenses.

BACKGROUND

With an increasing demand of miniaturized electronic products such as cellphones and tablet computers on imaging functions, higher requirements on hardware of image sensors such as charge-coupled devices (CCD) or complementary metal-oxide semiconductor elements (CMOS) and optical performances of imaging lens assemblies have been brought forward. In the situation where the sizes of the image planes of the sensors are the same, the larger the field-of-view of the imaging lens assembly is, the more the number of captured images is. Moreover, the reduction of the sizes of the pixels of the sensor would weaken the capability of an optical system to collect light. Accordingly, the imaging lens assembly needs to have a larger field-of-view and a large aperture, so as to further improve shooting performances. Meanwhile, when the imaging requirements are satisfied, the less the number of lenses in an optical lens assembly is and the shorter the total track length of the optical lens assembly is, the more conductive to the development of tendency of miniaturization of electronic products is.

Therefore, the present disclosure is intended to provide an ultra-thin optical system that may be applicable to portable electronic products and has a large field-of-view and a good imaging quality.

SUMMARY

Technical solutions provided by the present disclosure solve at least some of the above-mentioned technical problems.

According to an aspect, the present disclosure provides an optical imaging lens assembly having an effective focal length f and an entrance pupil diameter EPD. The optical imaging lens assembly includes, sequentially along an optical axis from an object side to an image side, a first lens, a second lens, a third lens, a fourth lens, and a fifth lens. The first lens may have a positive refractive power, and an object-side surface of the first lens may be a convex surface. The second lens may have a positive refractive power or a negative refractive power, and an object-side surface of the second lens may be a concave surface. The third lens may have a positive refractive power or a negative refractive power. The fourth lens may have a positive refractive power, and an image-side surface of the fourth lens may be a convex surface. The fifth lens may have a negative refractive power, and an object-side surface of the fifth lens and an image-side surface of the fifth lens may both be concave surfaces. A center thickness CT3 of the third lens on the optical axis and a center thickness CT4 of the fourth lens on the optical axis satisfy: $CT3/CT4 \geq 1.5$.

According to another aspect, the present disclosure further provides an optical imaging lens assembly having an effective focal length f and an entrance pupil diameter EPD. The optical imaging lens assembly includes, sequentially along an optical axis from an object side to an image side, a first lens, a second lens, a third lens, a fourth lens, and a fifth lens. Each of the first lens and the fourth lens has a positive refractive power. At least one of the second lens, the third lens, or the fifth lens has a negative refractive power. Half of a maximal field-of-view HFOV of the optical imaging lens assembly satisfies: $HFOV \geq 45°$. A center thickness CT3 of the third lens on the optical axis and a center thickness CT4 of the fourth lens on the optical axis satisfy: $CT3/CT4 \geq 1.5$.

In an implementation, the half of the maximal field-of-view HFOV of the optical imaging lens assembly satisfies: $HFOV \geq 45°$.

In an implementation, a radius of curvature R9 of an object-side surface of the fifth lens and a radius of curvature R10 of an image-side surface of the fifth lens may satisfy: $-0.9 < R10/R9 < -0.7$, for example, $-0.85 \leq R10/R9 \leq -0.76$.

In an implementation, the radius of curvature R9 of the object-side surface of the fifth lens and a center thickness CT5 of the fifth lens on the optical axis may satisfy: $-7 < R9/CT5 \leq -5$, for example, $-6.04 \leq R9/CT5 \leq -5.03$.

In an implementation, a maximum tilt angle β52 of the image-side surface of the fifth lens may satisfy: $30° < β52 < 58°$, for example, $30.6° \leq β52 \leq 57°$.

In an implementation, an effective focal length f1 of the first lens and a center thickness CT1 of the first lens on the optical axis may satisfy: $8.0 < f1/CT1 < 11.0$, for example, $8.52 \leq f1/CT1 \leq 10.66$.

In an implementation, the effective focal length f1 of the first lens and a radius of curvature R1 of an object-side surface of the first lens may satisfy: $1.0 < f1/R1 < 4.0$, for example, $1.82 \leq f1/R1 \leq 2.91$.

In an implementation, the effective focal length f of the optical imaging lens assembly and an effective focal length f4 of the fourth lens may satisfy: $0.65 \leq f4/f < 0.8$, for example, $0.70 \leq f4/f \leq 0.77$.

In an implementation, the effective focal length f4 of the fourth lens and the center thickness CT4 of the fourth lens on the optical axis may satisfy: $4.0 < f4/CT4 < 5.0$, for example, $4.39 \leq f4/CT4 \leq 4.71$.

In an implementation, the effective focal length f4 of the fourth lens and an effective focal length f5 of the fifth lens may satisfy: $-1.6 < f4/f5 < -1.4$, for example, $-1.54 \leq f4/f5 \leq -1.47$.

In an implementation, a radius of curvature R5 of an object-side surface of the third lens and a radius of curvature R6 of an image-side surface of the third lens may satisfy: $0 < |R6/R5| < 0.5$, for example, $0 < |R6/R5| \leq 0.25$.

In an implementation, the object-side surface of the first lens is a convex surface.

In an implementation, an object-side surface of the second lens is a concave surface.

In an implementation, an image-side surface of the fourth lens is a convex surface.

In an implementation, the fifth lens has a negative refractive power, and the object-side surface of the fifth lens and the image-side surface of the fifth lens are concave surfaces.

The optical imaging lens assembly with the above configuration may further have at least one of the beneficial effects such as ultra-thin, large field-of-view, high resolution, miniaturization, high imaging quality, or balanced aberration.

BRIEF DESCRIPTION OF THE DRAWINGS

By describing non-limiting implementations below in detail with reference to the accompanying drawings, other features, objectives and advantages of the present disclosure will be more apparent. In the accompanying drawings.

DETAILED DESCRIPTION

Figure 1:
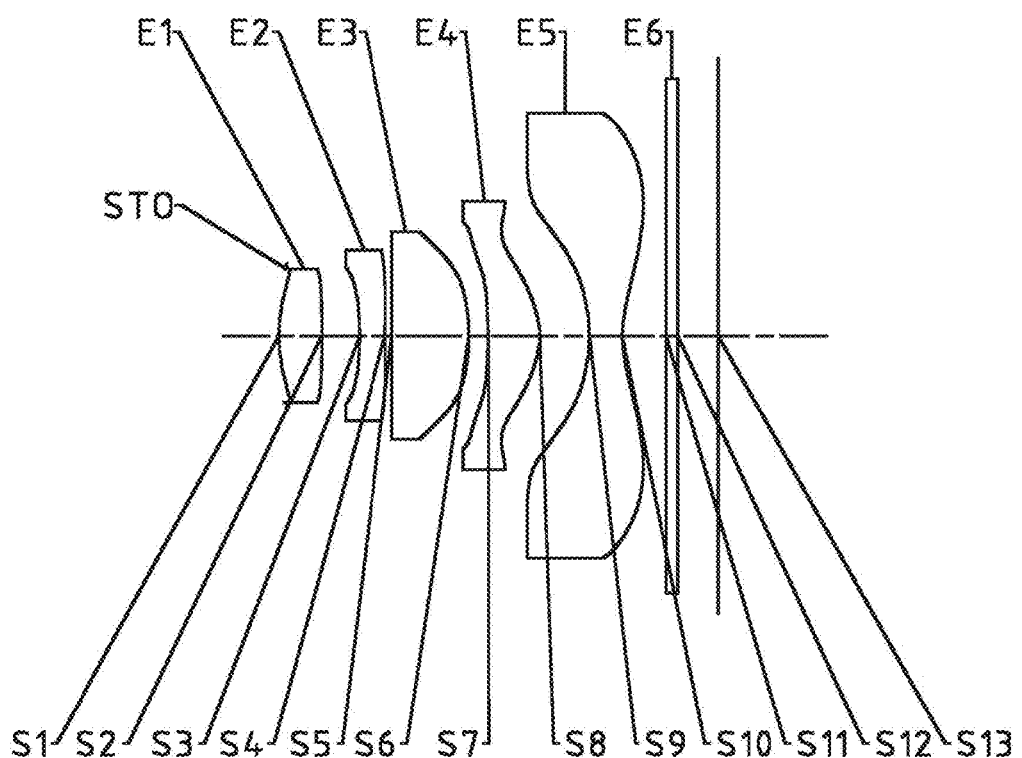
FIG. 1 is a schematic structural diagram illustrating an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions, such as "first," and "second" are only used to distinguish one feature from another, rather than represent any limitations to the features. Thus, the first lens discussed below may also be referred to as the second lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

As used herein, the terms "substantially," "about" and similar terms are used as a term of approximation and not as a term of degree, and are intended to account for the inherent deviations in measured or calculated values that would be recognized by those of ordinary skill in the art.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

In addition, the paraxial area refers to an area near the optical axis. The first lens is the lens closest to the object, and the fifth lens is the lens closest to the photosensitive element. In this specification, the surface closest to the object in each lens is referred to as the object-side surface, and the surface closest to the image plane in each lens is referred to as the image-side surface.

It should also be noted that the embodiments in the present disclosure and the features in the embodiments may be combined with each other on a non-conflict basis. The present disclosure will be described below in detail with reference to the accompanying drawings and in combination with the embodiments.

The present disclosure is further described below in combination with the embodiments.

The optical imaging lens assembly according to exemplary implementations of the present disclosure includes, for example, five lenses (i.e., a first lens, a second lens, a third lens, a fourth lens, and a fifth lens). The five lenses are arranged in sequence along an optical axis from an object side to an image side.

In an exemplary implementation, the first lens may have a positive refractive power, and an object-side surface of the first lens is a convex surface. The second lens may have a positive refractive power or a negative refractive power, and an object-side surface of the second lens is a concave surface. The third lens may have a positive refractive power or a negative refractive power. The fourth lens may have a positive refractive power, and an image-side surface of the fourth lens is a convex surface. The fifth lens may have a negative refractive power, and an object-side surface of the fifth lens and an image-side surface of the fifth lens may both be concave surfaces. By properly controlling the distribution of the positive and negative refractive powers of the lenses, the low-order aberrations of a control system may be effectively balanced, which makes the optical imaging lens assembly obtain a good imaging quality. Moreover, the characteristics of ultra-thin and large aperture may also be achieved.

In an exemplary implementation, half of a maximal field-of-view HFOV of the optical imaging lens assembly satisfies: HFOV≥45°. By controlling the optical system to have the half of the maximal field-of-view greater than 45° (i.e., the field-of-view greater than 90°), a wider visual field of the system where an image is formed may be ensured.

In an exemplary implementation, a center thickness CT3 of the third lens on the optical axis and a center thickness CT4 of the fourth lens on the optical axis may satisfy: CT3/CT4≥1.5. By controlling the ratio of the center thickness of the third lens on the optical axis to the center thickness of the fourth lens on the optical axis to be greater than 1.5, the distribution of the positive refractive powers of the two lenses is adjusted, so that the fourth lens undertakes more refractive powers. Such a configuration helps an incident ray of a large field-of-view to be finally converged on the image plane of the optical imaging lens assembly after passing through the lenses.

In an exemplary implementation, a radius of curvature R9 of the object-side surface of the fifth lens and a radius of curvature R10 of the image-side surface of the fifth lens may satisfy: −0.9<R10/R9<−0.7, and more specifically, may further satisfy: −0.85≤R10/R9≤−0.76. The radii of curvature of the object-side surface and image-side surface of the fifth lens are controlled within a proper range, which is conductive to effectively correcting tangential comatic aberrations of the system.

In an exemplary implementation, the radius of curvature R9 of the object-side surface of the fifth lens and a center thickness CT5 of the fifth lens on the optical axis may satisfy: −7<R9/CT5≤−5, and more specifically, may further satisfy: −6.04≤R9/CT5≤−5.03. With this configuration, the distortion generated in the large field-of-view system may be balanced, and at the same time, the angles of the chief rays in the rays of each of the fields reaching the image plane is large. Thus, the system is matched with a sensor chip having a large chief ray angle.

In an exemplary implementation, a maximum tilt angle β52 of the image-side surface of the fifth lens may satisfy: 30°<β52<58°, and more specifically, may further satisfy: 30.6°≤β52≤57°. By controlling the maximum tilt angle of the image-side surface of the fifth lens, it may be avoided that the effect of coating the edge of the lens is unsatisfactory due to the excessively large tilt angle, which leads to poor technology capability of the system.

In an exemplary implementation, an effective focal length f1 of the first lens and a center thickness CT1 of the first lens on the optical axis may satisfy: 8.0<f1/CT1<11.0, and more specifically, may further satisfy: 8.52≤f1/CT1≤10.66. By reasonably balancing the ratio of the effective focal length of the first lens to the center thickness, it is conductive to correcting the aberration of the optical imaging system, and the feasibility of the shaping and processing technologies may be ensured at the same time.

In an exemplary implementation, the effective focal length f1 of the first lens and a radius of curvature R1 of the object-side surface of the first lens may satisfy: 1.0<f1/R1<4.0, and more specifically, may further satisfy: 1.82≤f1/R1≤2.91. With this configuration, the radius of curvature of the object-side surface of the first lens is controlled not to be too small in the situation where the first lens undertakes a part of the positive refractive power, thus reducing the risk of generating a ghost image due to the large tilt angle.

In an exemplary implementation, an effective focal length f of the optical imaging lens assembly and an effective focal length f4 of the fourth lens may satisfy: 0.6≤f4/f<0.8, and more specifically, may further satisfy: 0.70≤f4/f≤0.77. With this configuration, when TTL is reduced, the influence of the aberration caused by the amount of deflection of light is controlled. At the same time, the incident angle of the light entering on the object-side surface of the fourth lens is reduced as much as possible, which is conductive to the transmittance of the light.

In an exemplary implementation, the effective focal length f4 of the fourth lens and the center thickness CT4 of the fourth lens on the optical axis may satisfy: 4.0<f4/CT4<5.0, and more specifically, may further satisfy: 4.39≤f4/CT4≤4.71. The center thickness of the lens may affect the value of the refractive power. By controlling the ratio of the focal length of the fourth lens to the center thickness within a certain range, it is conductive to correcting the distortion and astigmatism of the system, and may further avoid the problem of technology capability caused by the excessively large or small center thickness.

In an exemplary implementation, the effective focal length f4 of the fourth lens and an effective focal length f5 of the fifth lens may satisfy: −1.6<f4/f5<−1.4, and more specifically, may further satisfy: −1.54≤f4/f5≤−1.47. Through the reasonable allocation that one lens has a positive refractive power and the other lens has a negative refractive power, it is conductive to balancing the chromatic aberration generated by the system.

In an exemplary implementation, a radius of curvature R5 of an object-side surface of the third lens and a radius of curvature R6 of an image-side surface of the third lens may satisfy: 0<|R6/R5|<0.5, and more specifically, may further satisfy: 0<|R6/R5|≤0.25. By controlling the radii of curvature of the object-side surface and image-side surface of the third lens within a proper range, it is conductive to effectively correcting the astigmatism of the system.

In an exemplary implementation, the optical imaging lens assembly may also be provided with an aperture STO for limiting light beams, to adjust the amount of light admitted, thus improving the imaging quality.

The optical imaging lens assembly according to the above implementations of the present disclosure may use multiple lenses, for example, five lenses described above. By reasonably distributing the refractive powers and the surface types of the lenses, the center thicknesses of the lenses, the axial spacing distances between the lenses, etc., it is possible to effectively enlarge the aperture of the lens assembly, reduce the sensitivity of the lens assembly, ensure the miniaturization of the lens assembly, and improve the imaging quality, thus making the optical imaging lens assembly more conductive to the production and processing and applicable to the portable electronic products.

In the implementations of the present disclosure, at least one of the surfaces of the lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. In addition, the use of the aspheric lens may also effectively reduce the number of lenses in the optical system.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having five lenses is described as an example in the implementations, the optical imaging lens assembly is not limited to include five lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D.

FIG. 1 is a schematic structural diagram illustrating the optical imaging lens assembly according to Embodiment 1 of the present disclosure. As shown in FIG. 1, the optical imaging lens assembly includes, along an optical axis, five lenses E1-E5 arranged in sequence from an object side to an image side. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10.

In this embodiment, the first lens E1 has a positive refractive power, and the object-side surface S1 of the first lens E1 is a convex surface. The second lens E2 has a negative refractive power, and the object-side surface S3 of the second lens E2 is a concave surface. The third lens E3 has a positive refractive power. The fourth lens E4 has a positive refractive power, and the image-side surface S8 of the fourth lens E4 is a convex surface. The fifth lens E5 has a negative refractive power, the object-side surface S9 of the fifth lens E5 is a concave surface, and the image-side surface S10 of the fifth lens E5 is a concave surface.

In this embodiment, the optical imaging lens assembly further includes an aperture STO limiting light beams and disposed between the object side and the first lens. The optical imaging lens assembly according to Embodiment 1 may further include an optical filter E6 having an object-side surface S11 and an image-side surface S12. The optical filter E6 may be used to correct color deviations. Light from an object sequentially passes through the surfaces S1-S12 and finally forms an image on an image plane S13.

Table 1 shows the surface type, the radius of curvature, the thickness, the material and the conic coefficient of each lens of the optical imaging lens assembly in Embodiment 1.

TABLE 1

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.0751 | | | |
| S1 | aspheric | 2.1064 | 0.3999 | 1.55 | 56.1 | −0.3325 |
| S2 | aspheric | −327.9802 | 0.3567 | | | −42.4702 |
| S3 | aspheric | −4.7160 | 0.2400 | 1.67 | 20.4 | 21.1906 |
| S4 | aspheric | 12.0950 | 0.0629 | | | 24.6215 |
| S5 | aspheric | 12.3975 | 0.7224 | 1.55 | 56.1 | −94.8027 |
| S6 | aspheric | −2.5649 | 0.1820 | | | 0.4522 |
| S7 | aspheric | −4.2325 | 0.4816 | 1.55 | 56.1 | 9.8250 |
| S8 | aspheric | −0.9969 | 0.4668 | | | −3.8134 |
| S9 | aspheric | −1.8535 | 0.3068 | 1.55 | 56.1 | −0.0426 |
| S10 | aspheric | 1.5773 | 0.4138 | | | −2.1268 |
| S11 | spherical | infinite | 0.1100 | 1.52 | 64.2 | |
| S12 | spherical | infinite | 0.3793 | | | |
| S13 | spherical | infinite | | | | |

As may be obtained from Table 1, the center thickness CT3 of the third lens E3 on the optical axis and the center thickness CT4 of the fourth lens E4 on the optical axis satisfy: CT3/CT4=1.5. The radius of curvature R9 of the object-side surface S9 of the fifth lens E5 and the radius of curvature of the image-side surface S10 of the fifth lens E5 satisfy: R10/R9=−0.85. The radius of curvature R9 of the object-side surface S9 of the fifth lens E5 and the center thickness CT5 of the fifth lens E5 on the optical axis satisfy: R9/CT5=−6.04. The radius of curvature R5 of the object-side surface S5 of the third lens E3 and the radius of curvature R6 of the image-side surface S6 of the third lens E3 satisfy: |R6/R5|=0.21.

In this embodiment, the optical imaging lens assembly including five lenses is used as an example. By reasonably distributing the focal lengths and the surface types of the lenses, the aperture of the lens assembly is effectively enlarged, the total length of the lens assembly is effectively reduced, which ensures the large aperture and the miniaturization of the lens assembly. At the same time, various aberrations are corrected, thereby improving the resolution and the imaging quality of the lens assembly. The surface type x of each aspheric surface is defined by the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1 above); and Ai is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$, and $A_{20}$ applicable to the surfaces S1-S10 in Embodiment 1.

TABLE 2

| surface number | A4 | A6 | A8 | A10 | A12 |
|---|---|---|---|---|---|
| S1 | −5.8555E−02 | 8.6024E−01 | −1.1997E+01 | 9.2457E+01 | −4.3589E+02 |
| S2 | 2.8296E−02 | −2.2745E+00 | 2.7480E+01 | −2.0073E+02 | 8.9229E+02 |
| S3 | −2.0736E−01 | 1.0529E+00 | −8.6469E+00 | 4.8400E+01 | −1.8968E+02 |
| S4 | −1.5770E−01 | 1.4602E−01 | 6.7657E−01 | −4.4322E+00 | 1.0498E+01 |
| S5 | −2.5081E−02 | −7.0138E−01 | 3.4800E+00 | −9.3165E+00 | 1.4395E+01 |
| S6 | 1.7448E−01 | −1.3020E+00 | 2.4663E+00 | −2.8381E+00 | 2.1569E+00 |
| S7 | 3.9027E−01 | −1.6664E+00 | 3.5613E+00 | −6.6358E+00 | 1.0268E+01 |
| S8 | 8.6878E−02 | −3.7594E−01 | 6.8801E−01 | −1.2486E+00 | 1.8577E+00 |
| S9 | 2.5984E−01 | −8.9731E−01 | 1.5984E+00 | −1.6883E+00 | 1.1051E+00 |
| S10 | −2.3623E−01 | 1.7748E−01 | −9.0375E−02 | 2.8762E−02 | −5.5517E−03 |

| surface number | A14 | A16 | A18 | A20 |
|---|---|---|---|---|
| S1 | 1.2664E+03 | −2.2133E+03 | 2.1313E+03 | −8.6883E+02 |
| S2 | −2.4547E+03 | 4.0742E+03 | −3.7360E+03 | 1.4524E+03 |
| S3 | 4.8130E+02 | −7.4700E+02 | 6.4277E+02 | −2.3507E+02 |
| S4 | −1.3518E+01 | 1.0585E+01 | −4.9644E+00 | 1.0789E+00 |
| S5 | −1.2625E+01 | 6.0002E+00 | −1.3196E+00 | 7.3809E−02 |
| S6 | −1.0130E+00 | 2.2258E−01 | 0.0000E+00 | 0.0000E+00 |
| S7 | −1.0462E+01 | 6.3400E+00 | −2.0797E+00 | 2.8471E−01 |
| S8 | −1.5726E+00 | 7.2040E−01 | −1.6927E−01 | 1.6099E−02 |
| S9 | −4.4707E−01 | 1.0887E−01 | −1.4664E−02 | 8.4227E−04 |
| S10 | 6.3450E−04 | −4.6846E−05 | 3.2829E−06 | −1.8006E−07 |

Table 3 below shows the effective focal lengths f1-f5 of the lenses in Embodiment 1, the effective focal length f of the optical imaging lens assembly, the half of the diagonal length ImgH of the effective pixel area of the electronic photosensitive element of the optical imaging lens assembly, and the distance TTL on the optical axis from the object-side surface S1 of the first lens E1 to the image plane S13 of the optical imaging lens assembly.

TABLE 3

| f1(mm) | 3.83 | f(mm) | 2.95 |
|---|---|---|---|
| f2(mm) | −5.06 | TTL(mm) | 4.12 |
| f3(mm) | 3.96 | ImgH(mm) | 3.01 |
| f4(mm) | 2.27 | | |
| f5(mm) | −1.51 | | |

As may be obtained from Table 3, the effective focal length f of the optical imaging lens assembly and the effective focal length f4 of the fourth lens E4 satisfy: f4/f=0.77. The effective focal length f4 of the fourth lens E4 and the effective focal length f5 of the fifth lens E5 satisfy: f4/f5=−1.5.

By combining Table 1 and Table 3, in this embodiment, the half of the maximal field-of-view HFOV of the optical imaging lens assembly satisfies: HFOV=45.5°. The maximum tilt angle β52 of the image-side surface S10 of the fifth lens E5 satisfies: β52=57°. The effective focal length f1 of the first lens E1 and the center thickness CT1 of the first lens E1 on the optical axis satisfy: f1/CT1=9.59. The effective focal length f1 of the first lens E1 and the radius of curvature R1 of the object-side surface S1 of the first lens E1 satisfy: f1/R1=1.82. The effective focal length f4 of the fourth lens E4 and the center thickness CT4 of the fourth lens E4 on the optical axis satisfy: f4/CT4=4.71.

Figures 2A, 2B:
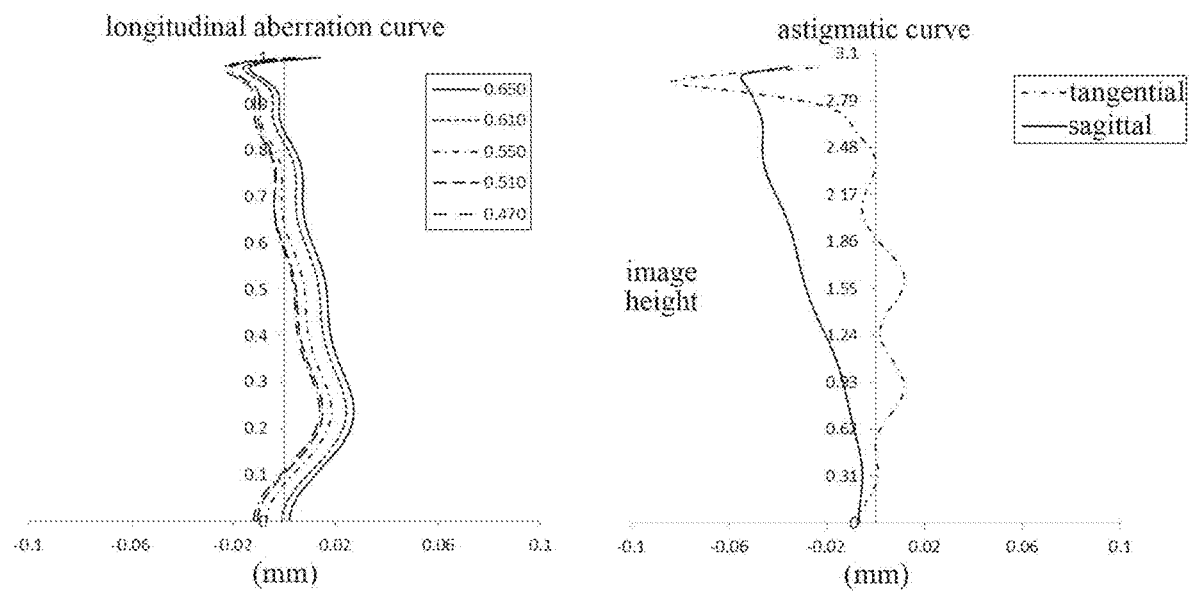
FIGS. 2A-2D respectively illustrate a longitudinal aberration curve, an astigmatic curve, a distortion curve, and a lateral color curve of the optical imaging lens assembly according to Embodiment 1.
Figures 2C, 2D:
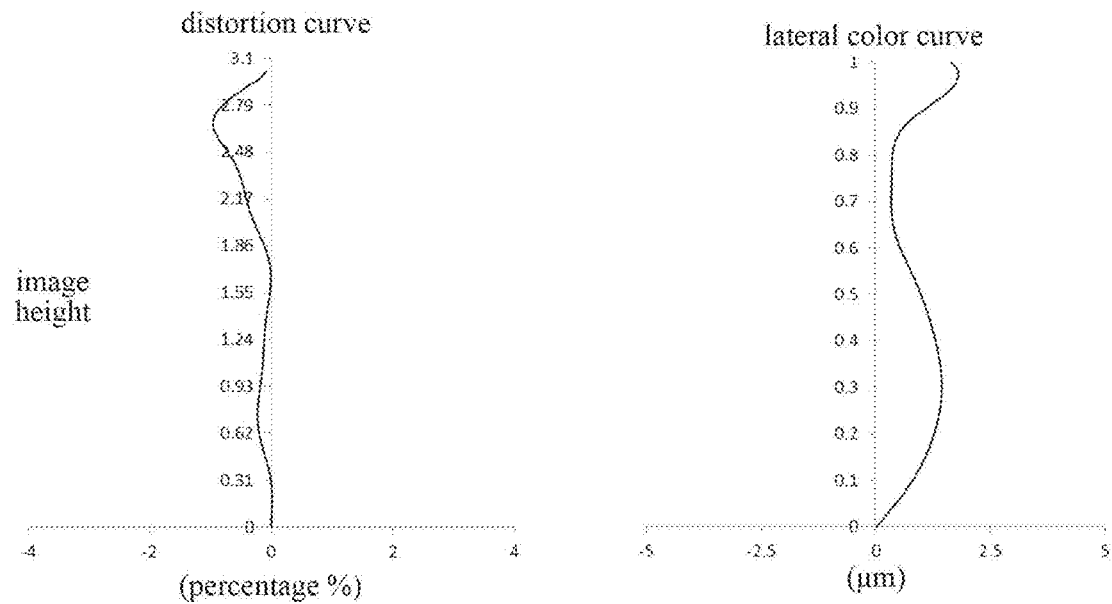

FIG. 2A illustrates the longitudinal aberration curve of the optical imaging lens assembly according to Embodiment 1, representing deviations of focal points of light of different wavelengths converged after passing through the optical imaging lens assembly. FIG. 2B illustrates the astigmatic curve of the optical imaging lens assembly according to Embodiment 1, representing a curvature of the tangential image plane and a curvature of the sagittal image plane. FIG. 2C illustrates the distortion curve of the optical imaging lens assembly according to Embodiment 1, representing amounts of distortion at different viewing angles. FIG. 2D illustrates the lateral color curve of the optical imaging lens assembly according to Embodiment 1, representing deviations of different image heights on the image plane after light passes through the optical imaging lens assembly. It can be seen from FIGS. 2A-2D that the optical imaging lens assembly according to Embodiment 1 can achieve a good imaging quality.

Embodiment 2

An optical imaging lens assembly according to Embodiment 2 of the present disclosure is described below with reference to FIGS. 3-4D.

Figure 3:
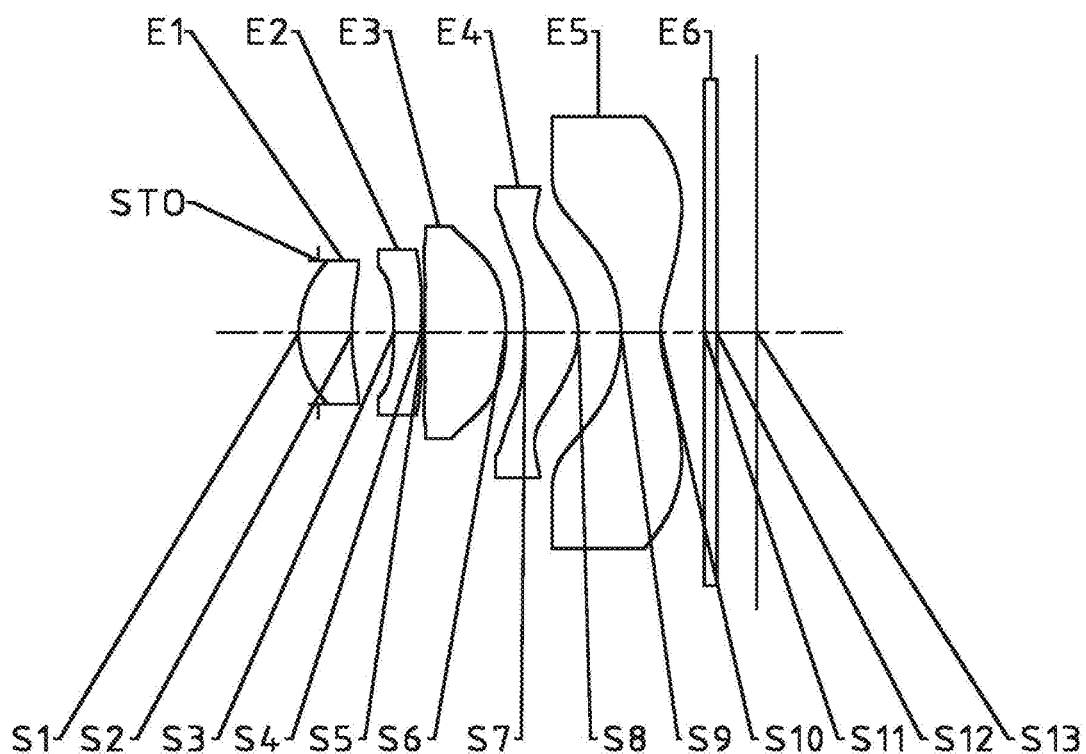
FIG. 3 is a schematic structural diagram illustrating an optical imaging lens assembly according to Embodiment 2 of the present disclosure.

FIG. 3 is a schematic structural diagram illustrating the optical imaging lens assembly according to Embodiment 2 of the present disclosure. As shown in FIG. 3, the optical imaging lens assembly according to Embodiment 2 includes first to fifth lenses E1-E5 respectively having an object-side surface and an image-side surface.

In this embodiment, the first lens E1 has a positive refractive power, and the object-side surface S1 of the first lens E1 is a convex surface. The second lens E2 has a negative refractive power, and the object-side surface S3 of the second lens E2 is a concave surface. The third lens E3 has a positive refractive power. The fourth lens E4 has a positive refractive power, and the image-side surface S8 of the fourth lens E4 is a convex surface. The fifth lens E5 has a negative refractive power, the object-side surface S9 of the fifth lens E5 is a concave surface, and the image-side surface S10 of the fifth lens E5 is a concave surface.

Table 4 below shows the surface type, the radius of curvature, the thickness, the material and the conic coefficient of each lens of the optical imaging lens assembly in Embodiment 2. Table 5 shows the high-order coefficients of each aspheric surface in Embodiment 2. Table 6 shows the effective focal lengths f1-f5 of the lenses in Embodiment 2, the effective focal length f of the optical imaging lens assembly, the half of the diagonal length ImgH of the effective pixel area of the electronic photosensitive element of the optical imaging lens assembly, and the distance TTL on the optical axis from the object-side surface S1 of the first lens E1 to the image plane S13 of the optical imaging lens assembly. The surface type of each aspheric surface may be defined by the formula (1) given in Embodiment 1.

TABLE 4

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.1713 | | | |
| S1 | aspheric | 1.4080 | 0.4647 | 1.55 | 56.1 | 0.4890 |
| S2 | aspheric | 3.5668 | 0.3692 | | | −64.7450 |
| S3 | aspheric | −5.7515 | 0.2400 | 1.67 | 20.4 | 35.2665 |
| S4 | aspheric | 13.0990 | 0.0300 | | | −99.0000 |
| S5 | aspheric | 13.0959 | 0.7135 | 1.55 | 56.1 | 30.8855 |
| S6 | aspheric | −2.5855 | 0.1671 | | | 0.5694 |
| S7 | aspheric | −4.5392 | 0.4702 | 1.55 | 56.1 | 9.4085 |
| S8 | aspheric | −0.9571 | 0.3755 | | | −3.8784 |
| S9 | aspheric | −1.8143 | 0.3447 | 1.55 | 56.1 | −0.0691 |
| S10 | aspheric | 1.4081 | 0.3859 | | | −2.5457 |
| S11 | spherical | infinite | 0.1100 | 1.52 | 64.2 | |
| S12 | spherical | infinite | 0.3514 | | | |
| S13 | spherical | infinite | | | | |

TABLE 5

| surface number | A4 | A6 | A8 | A10 | A12 |
|---|---|---|---|---|---|
| S1 | −3.6729E−02 | 6.3341E−01 | −5.7592E+00 | 3.1842E+01 | −1.1053E+02 |
| S2 | 1.9468E−01 | −5.4890E−01 | 1.8660E+00 | −5.9632E+00 | 1.1579E+01 |
| S3 | −2.4465E−01 | 4.9088E−01 | −6.7769E+00 | 4.9422E+01 | −2.2272E−02 |
| S4 | 2.1837E−02 | −1.9427E+00 | 9.7097E+00 | −2.8065E+01 | 5.0398E−01 |
| S5 | 1.8383E−01 | −2.5236E+00 | 1.1372E+01 | −3.1307E+01 | 5.5384E+01 |
| S6 | 6.0199E−02 | −5.4389E−01 | 1.9434E−01 | 9.9185E−01 | −1.6566E+00 |
| S7 | 1.7648E−01 | −3.2546E−01 | −8.1130E−01 | 2.5727E+00 | −2.7849E+00 |
| S8 | 8.9828E−03 | 9.8804E−02 | −6.8025E−01 | 1.2111E+00 | −9.6806E−01 |
| S9 | 2.4202E−01 | −9.2651E−01 | 1.6620E+00 | −1.7276E+00 | 1.1070E+00 |
| S10 | −2.9784E−01 | 2.7344E−01 | −1.7542E−01 | 7.8135E−02 | −2.4402E−02 |

| surface number | A14 | A16 | A18 | A20 |
|---|---|---|---|---|
| S1 | 2.4248E+02 | −3.2672E+02 | 2.4697E+02 | −8.0480E+01 |
| S2 | −1.1589E+01 | 9.7014E−01 | 5.3507E+00 | −2.2065E+00 |
| S3 | 6.0894E+02 | −9.9405E+02 | 8.8818E+02 | −3.3572E+02 |
| S4 | −5.4872E+01 | 3.4033E+01 | −1.0373E+01 | 1.0164E+00 |
| S5 | −6.2070E+01 | 4.2503E+01 | −1.6233E+01 | 2.6526E+00 |
| S6 | 1.0544E+00 | −2.3972E−01 | 0.0000E+00 | 0.0000E+00 |
| S7 | 1.5312E+00 | −4.2391E−01 | 4.0605E−02 | 2.5780E−03 |
| S8 | 4.1650E−01 | −1.0057E−01 | 1.2879E−02 | −6.8365E−04 |
| S9 | −4.3749E−01 | 1.0395E−01 | −1.3659E−02 | 7.6617E−04 |
| S10 | 5.2549E−03 | −7.4082E−04 | 6.1135E−05 | −2.2229E−06 |

TABLE 6

| | | | |
|---|---|---|---|
| f1(mm) | 3.96 | f(mm) | 2.98 |
| f2(mm) | −5.96 | TTL(mm) | 4.02 |
| f3(mm) | 4.02 | ImgH(mm) | 3.01 |
| f4(mm) | 2.12 | | |
| f5(mm) | −1.40 | | |

Figure 4A:
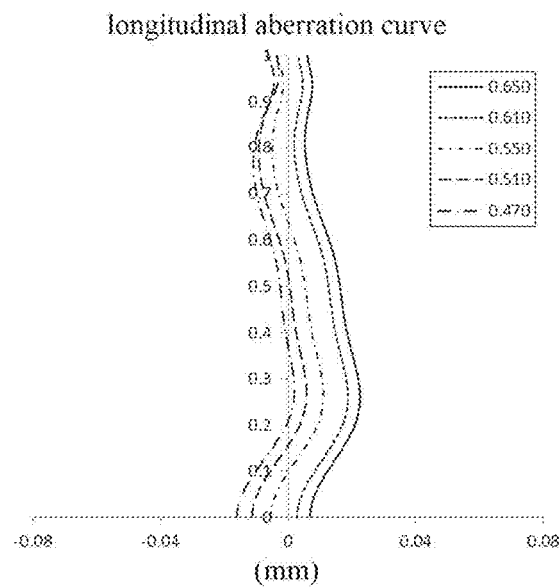
FIGS. 4A-4D respectively illustrate a longitudinal aberration curve, an astigmatic curve, a distortion curve, and a lateral color curve of the optical imaging lens assembly according to Embodiment 2.
Figure 4B:
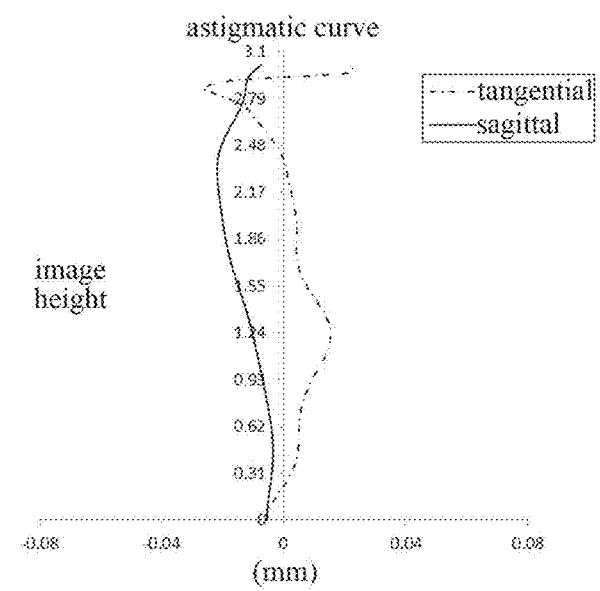
Figure 4C:
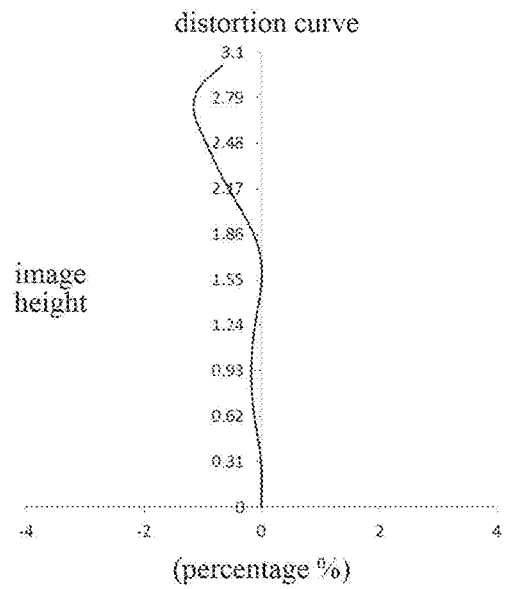
Figure 4D:
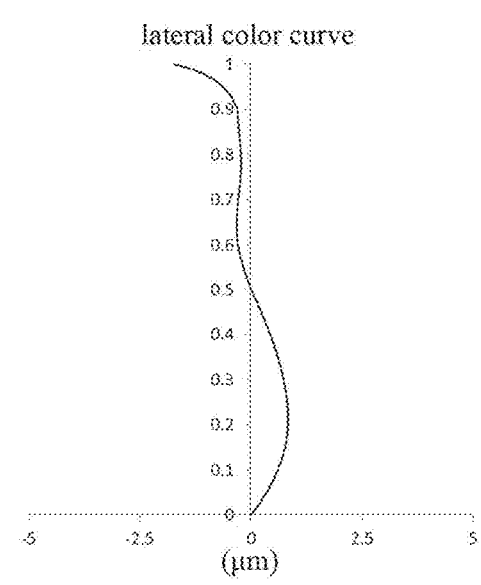

FIG. 4A illustrates the longitudinal aberration curve of the optical imaging lens assembly according to Embodiment 2, representing deviations of focal points of light of different wavelengths converged after passing through the optical imaging lens assembly. FIG. 4B illustrates the astigmatic curve of the optical imaging lens assembly according to Embodiment 2, representing a curvature of the tangential image plane and a curvature of the sagittal image plane. FIG. 4C illustrates the distortion curve of the optical imaging lens assembly according to Embodiment 2, representing amounts of distortion at different viewing angles. FIG. 4D illustrates the lateral color curve of the optical imaging lens assembly according to Embodiment 2, representing deviations of different image heights on the image plane after light passes through the optical imaging lens assembly. It can be seen from FIGS. 4A-4D that the optical imaging lens assembly according to Embodiment 2 can achieve a good imaging quality.

Embodiment 3

An optical imaging lens assembly according to Embodiment 3 of the present disclosure is described below with reference to FIGS. 5-6D.

Figure 5:
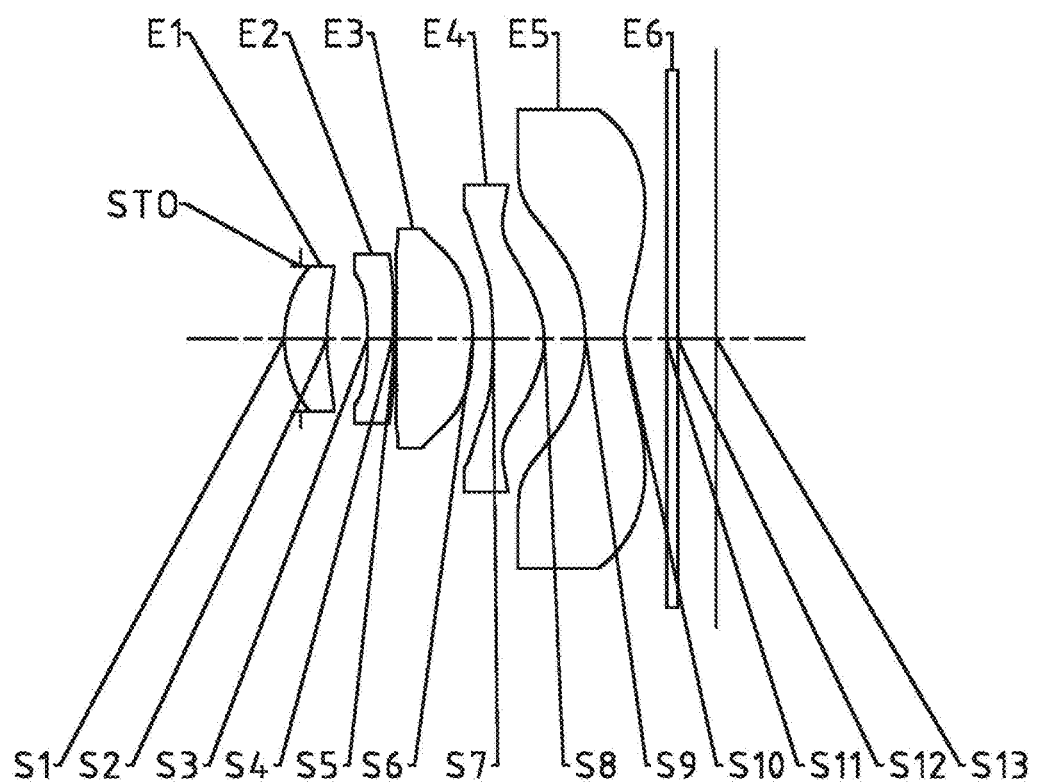
FIG. 5 is a schematic structural diagram illustrating an optical imaging lens assembly according to Embodiment 3 of the present disclosure.

FIG. 5 is a schematic structural diagram illustrating the optical imaging lens assembly according to Embodiment 3 of the present disclosure. As shown in FIG. 5, the optical imaging lens assembly according to Embodiment 3 includes first to fifth lenses E1-E5 respectively having an object-side surface and an image-side surface.

In this embodiment, the first lens E1 has a positive refractive power, and the object-side surface S1 of the first lens E1 is a convex surface. The second lens E2 has a negative refractive power, and the object-side surface S3 of the second lens E2 is a concave surface. The third lens E3 has a positive refractive power. The fourth lens E4 has a positive refractive power, and the image-side surface S8 of the fourth lens E4 is a convex surface. The fifth lens E5 has a negative refractive power, the object-side surface S9 of the fifth lens E5 is a concave surface, and the image-side surface S10 of the fifth lens E5 is a concave surface.

Table 7 below shows the surface type, the radius of curvature, the thickness, the material and the conic coefficient of each lens of the optical imaging lens assembly in Embodiment 3. Table 8 shows the high-order coefficients of each aspheric surface in Embodiment 3. Table 9 shows the effective focal lengths f1-f5 of the lenses in Embodiment 3, the effective focal length f of the optical imaging lens assembly, the half of the diagonal length ImgH of the effective pixel area of the electronic photosensitive element of the optical imaging lens assembly, and the distance TTL on the optical axis from the object-side surface S1 of the first lens E1 to the image plane S13 of the optical imaging lens assembly. The surface type of each aspheric surface may be defined by the formula (1) given in Embodiment. 1.

TABLE 7

| | | | | material | | |
|---|---|---|---|---|---|---|
| surface number | surface type | radius of curvature | thick-ness | re-fractive index | abbe number | conic coefficient |
| OBJ | spherical | infinite | infinite | | | |
| STO | spherical | infinite | −0.1513 | | | |
| S1 | aspheric | 1.4025 | 0.4003 | 1.55 | 56.1 | 0.5058 |
| S2 | aspheric | 3.4981 | 0.3697 | | | −65.0624 |
| S3 | aspheric | −5.8792 | 0.2400 | 1.67 | 20.4 | 37.8606 |
| S4 | aspheric | 11.5369 | 0.0300 | | | −73.6438 |
| S5 | aspheric | 10.9050 | 0.7104 | 1.55 | 56.1 | 31.1354 |
| S6 | aspheric | −2.6260 | 0.1853 | | | 0.6588 |
| S7 | aspheric | −4.5436 | 0.4736 | 1.55 | 56.1 | 9.3974 |
| S8 | aspheric | −0.9572 | 0.3812 | | | −3.7940 |
| S9 | aspheric | −1.8130 | 0.3598 | 1.55 | 56.1 | −0.0708 |
| S10 | aspheric | 1.4324 | 0.3879 | | | −2.4987 |
| S11 | spherical | infinite | 0.1100 | 1.52 | 64.2 | |
| S12 | spherical | infinite | 0.3534 | | | |
| S13 | spherical | infinite | | | | |

TABLE 8

| surface number | A4 | A6 | A8 | A10 | A12 |
|---|---|---|---|---|---|
| S1 | −3.8537E−02 | 7.7621E−01 | −7.6557E+00 | 4.5775E+01 | −1.7148E+02 |
| S2 | 2.0655E−01 | −6.0241E−01 | 1.8245E+00 | −3.2881E+00 | −7.9348E+00 |
| S3 | −2.0145E−01 | −3.8101E−01 | 2.4418E+00 | −8.6972E+00 | 4.1258E+00 |
| S4 | 6.5206E−02 | −2.4146E+00 | 1.2330E+01 | −3.6240E+01 | 6.6012E+01 |
| S5 | 2.1023E−01 | −2.8335E+00 | 1.2879E+01 | −3.5216E+01 | 6.1533E+01 |
| S6 | 5.5594E−02 | −5.0529E−01 | 8.3808E−02 | 1.1961E+00 | −1.9002E+00 |
| S7 | 1.6996E−01 | −2.5469E−01 | −1.0662E+00 | 3.1369E+00 | −3.5785E+00 |
| S8 | 1.1782E−02 | 9.0532E−02 | −6.8732E−01 | 1.2488E+00 | −1.0066E+00 |
| S9 | 2.4183E−01 | −9.2337E−01 | 1.6564E+00 | −1.7256E+00 | 1.1092E+00 |
| S10 | −2.8536E−01 | 2.5669E−01 | −1.6224E−01 | 7.1340E−02 | −2.2076E−02 |

| surface number | A14 | A16 | A18 | A20 |
|---|---|---|---|---|
| S1 | 4.0526E+02 | −5.8742E+02 | 4.7704E+02 | −1.6687E+02 |
| S2 | 5.7717E+01 | −1.3436E+02 | 1.4307E+02 | −5.9557E+01 |
| S3 | 5.4160E+01 | −1.6935E+02 | 2.0818E+02 | −9.8514E+01 |
| S4 | −7.3372E+01 | 4.6976E+01 | −1.5042E+01 | 1.6153E+00 |
| S5 | −6.8228E+01 | 4.6378E+01 | −1.7635E+01 | 2.8749E+00 |
| S6 | 1.2053E+00 | −2.7552E−01 | 0.0000E+00 | 0.0000E+00 |
| S7 | 2.2178E+00 | −7.7615E−01 | 1.3892E−01 | −8.9261E−03 |

TABLE 8-continued

| | | | | |
|---|---|---|---|---|
| S8 | 4.3294E−01 | −1.0308E−01 | 1.2689E−02 | −6.1620E−04 |
| S9 | −4.4017E−01 | 1.0513E−01 | −1.3900E−02 | 7.8528E−04 |
| S10 | 4.7276E−03 | −6.6469E−04 | 5.4803E−05 | −1.9933E−06 |

TABLE 9

| | | | |
|---|---|---|---|
| f1(mm) | 4.01 | f(mm) | 2.95 |
| f2(mm) | −5.80 | TTL(mm) | 4.00 |
| f3(mm) | 3.95 | ImgH(mm) | 3.01 |
| f4(mm) | 2.12 | | |
| f5(mm) | −1.41 | | |

Figures 6A, 6B:
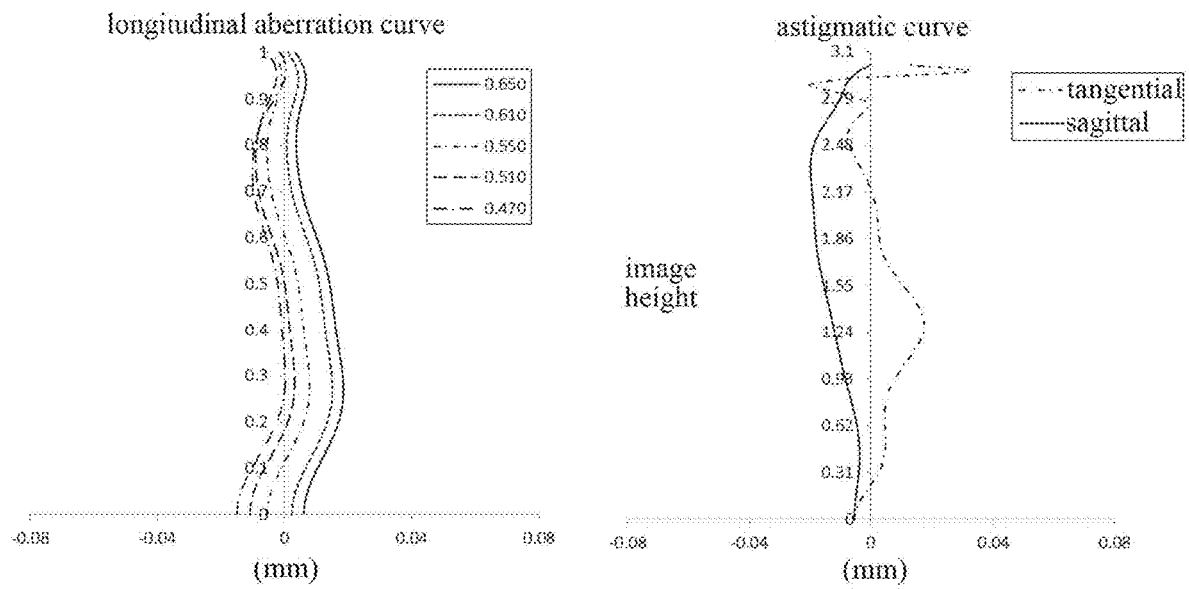
FIGS. 6A-6D respectively illustrate a longitudinal aberration curve, an astigmatic curve, a distortion curve, and a lateral color curve of the optical imaging lens assembly according to Embodiment 3.
Figures 6C, 6D:
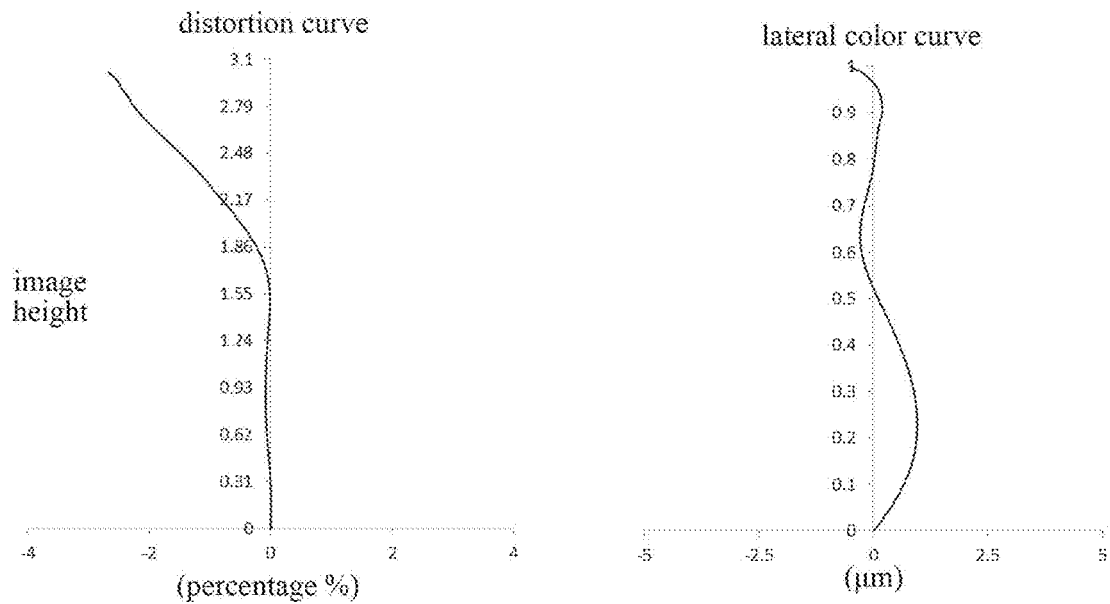

FIG. 6A illustrates the longitudinal aberration curve of the optical imaging lens assembly according to Embodiment 3, representing deviations of focal points of light of different wavelengths converged after passing through the optical imaging lens assembly. FIG. 6B illustrates the astigmatic curve of the optical imaging lens assembly according to Embodiment 3, representing a curvature of the tangential image plane and a curvature of the sagittal image plane. FIG. 6C illustrates the distortion curve of the optical imaging lens assembly according to Embodiment 3, representing amounts of distortion at different viewing angles. FIG. 6D illustrates the lateral color curve of the optical imaging lens assembly according to Embodiment 3, representing deviations of different image heights on the image plane after light passes through the optical imaging lens assembly. It can be seen from FIGS. 6A-6D that the optical imaging lens assembly according to Embodiment 3 can achieve a good imaging quality.

Embodiment 4

An optical imaging lens assembly according to Embodiment 4 of the present disclosure is described below with reference to FIGS. 7-8D.

Figure 7:
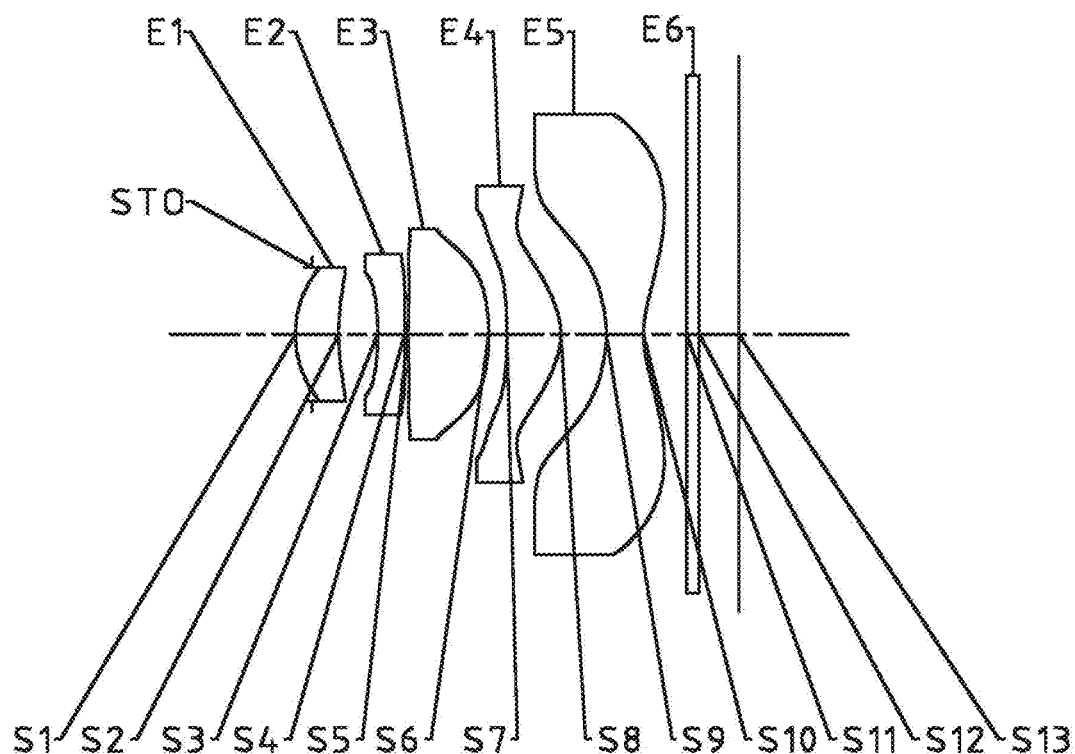
FIG. 7 is a schematic structural diagram illustrating an optical imaging lens assembly according to Embodiment 4 of the present disclosure.

FIG. 7 is a schematic structural diagram illustrating the optical imaging lens assembly according to Embodiment 4 of the present disclosure. As shown in FIG. 7, the optical imaging lens assembly according to Embodiment 4 includes first to fifth lenses E1-E5 respectively having an object-side surface and so image-side surface.

In this embodiment, the first lens E1 has a positive refractive power, and the object-side surface S1 of the first lens E1 is a convex surface. The second lens E2 has a negative refractive power, and the object-side surface S3 of the second lens E2 is a concave surface. The third lens E3 has a positive refractive power. The fourth lens E4 has a positive refractive power, and the image-side surface S8 of the fourth lens E4 is a convex surface. The fifth lens E5 has a negative refractive power, the object-side surface S9 of the fifth lens E5 is a concave surface, and the image-side surface S10 of the fifth lens E5 is a concave surface.

Table 10 below shows the surface type, the radius of curvature, the thickness, the material and the conic coefficient of each lens of the optical imaging lens assembly in Embodiment 4. Table 11 shows the high-order coefficients of each aspheric surface in Embodiment 4. Table 12 shows the effective focal lengths f1-f5 of the lenses in Embodiment 4, the effective focal length f of the optical imaging lens assembly, the half of the diagonal length ImgH of the effective pixel area of the electronic photosensitive element of the optical imaging lens assembly, and the distance TTL on the optical axis from the object-side surface S1 of the first lens E1 to the image plane S13 of the optical imaging lens assembly. The surface type of each aspheric surface may be defined by the formula (1) given in Embodiment 1.

TABLE 10

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.1501 | | | |
| S1 | aspheric | 1.4074 | 0.3848 | 1.55 | 56.1 | 0.5190 |
| S2 | aspheric | 3.4189 | 0.3474 | | | −61.4684 |
| S3 | aspheric | −6.3527 | 0.2400 | 1.67 | 20.4 | 40.9338 |
| S4 | aspheric | 11.3167 | 0.0300 | | | −68.5531 |
| S5 | aspheric | 10.5920 | 0.71178 | 1.55 | 56.1 | 34.4387 |
| S6 | aspheric | −2.6597 | 0.1614 | | | 0.8097 |
| S7 | aspheric | −4.5714 | 0.4785 | 1.55 | 56.1 | 9.4303 |
| S8 | aspheric | −0.9510 | 0.4031 | | | −3.6628 |
| S9 | aspheric | −1.8132 | 0.3291 | 1.55 | 56.1 | −0.0722 |
| S10 | aspheric | 1.4593 | 0.3857 | | | −2.4924 |
| S11 | spherical | infinite | 0.1100 | 1.52 | 64.2 | |
| S12 | spherical | infinite | 0.3512 | | | |
| S13 | spherical | infinite | | | | |

TABLE 11

| surface number | A4 | A6 | A8 | A10 | A12 |
|---|---|---|---|---|---|
| S1 | −6.5026E−02 | 1.3504E+00 | −1.4003E+01 | 8.7648E+01 | −3.4254E+02 |
| S2 | 2.0552E−01 | −3.8805E−01 | −1.6046E+00 | 2.5674E+01 | −1.5232E+02 |
| S3 | −1.9953E−01 | −3.5357E−01 | 1.0058E+00 | 6.0384E+00 | −7.4877E+01 |
| S4 | 6.2592E−02 | −2.3416E+00 | 1.1447E+01 | −3.1261E+01 | 5.0602E+01 |
| S5 | 2.1163E−01 | −2.8454E+00 | 1.2861E+01 | −3.4733E+01 | 5.9786E+01 |
| S6 | 6.8961E−02 | −5.1854E−01 | −3.0846E−02 | 1.5295E+00 | −2.2853E+00 |
| S7 | 1.8042E−01 | −2.6511E−01 | −1.2392E+00 | 3.7514E+00 | −4.5304E+00 |
| S8 | 1.3044E−02 | 7.6387E−02 | −6.5353E−01 | 1.2143E+00 | −9.8358E−01 |

TABLE 11-continued

| | | | | | |
|---|---|---|---|---|---|
| S9 | 2.4520E−01 | −9.3274E−01 | 1.6726E+00 | −1.7488E+00 | 1.1306E+00 |
| S10 | −2.7573E−01 | 2.3908E−01 | −1.4593E−01 | 6.2035E−02 | −1.8739E−02 |

| surface number | A14 | A16 | A18 | A20 |
|---|---|---|---|---|
| S1 | 8.4227E+02 | −1.2667E+03 | 1.0644E+03 | −3.8361E+02 |
| S2 | 4.9682E+02 | −9.3619E+02 | 9.5031E+02 | −4.0422E+02 |
| S3 | 3.0282E+02 | −6.3377E+02 | 6.8569E+02 | −3.0809E+02 |
| S4 | −4.5223E+01 | 1.6551E+01 | 2.9945E+00 | −2.9041E+00 |
| S5 | −6.5301E+01 | 4.3754E+01 | −1.6409E+01 | 2.6394E+00 |
| S6 | 1.4115E+00 | −3.1745E−01 | 0.0000E+00 | 0.0000E+00 |
| S7 | 3.0407E+00 | −1.1892E+00 | 2.5189E−01 | −2.1987E−02 |
| S8 | 4.2097E−01 | −9.8640E−02 | 1.1734E−02 | −5.2997E−04 |
| S9 | −4.5208E−01 | 1.0899E−01 | −1.4568E−02 | 8.3289E−04 |
| S10 | 3.9817E−03 | −5.6508E−04 | 4.7647E−05 | −1.7854E−06 |

TABLE 12

| | | | |
|---|---|---|---|
| f1(mm) | 4.10 | f(mm) | 2.87 |
| f2(mm) | −6.06 | TTL(mm) | 3.94 |
| f3(mm) | 3.97 | ImgH(mm) | 3.01 |
| f4(mm) | 2.10 | | |
| f5(mm) | −1.43 | | |

Figure 8A:
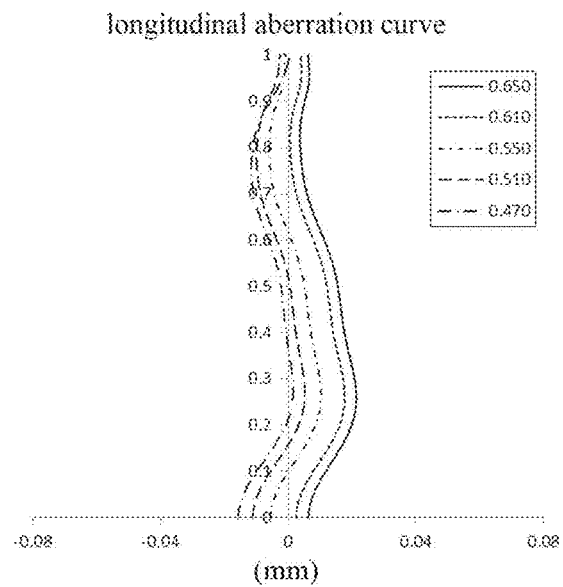
FIGS. 8A-8D respectively illustrate a longitudinal aberration curve, an astigmatic curve, a distortion curve, and a lateral color curve of the optical imaging lens assembly according to Embodiment 4.
Figure 8B:
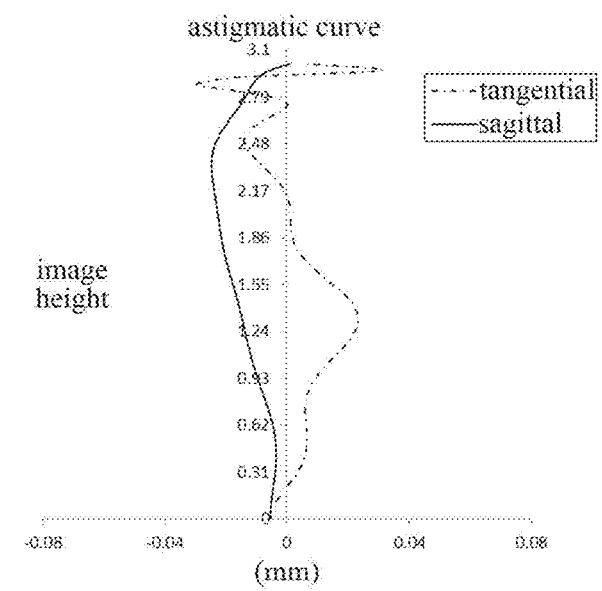
Figure 8C:
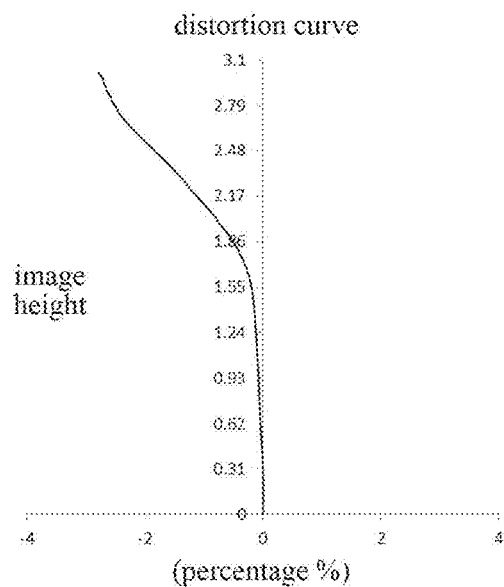
Figure 8D:
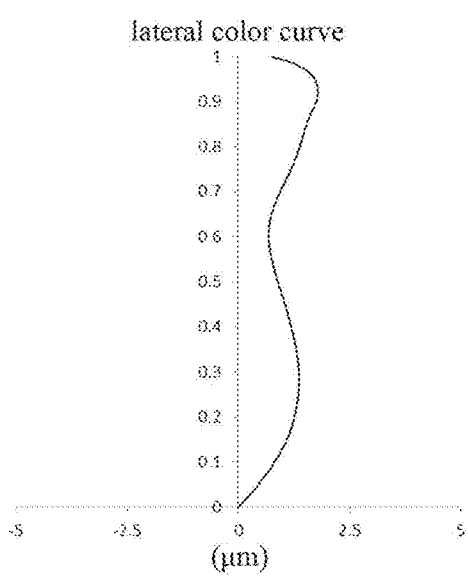

FIG. 8A illustrates the longitudinal aberration curve of the optical imaging lens assembly according to Embodiment 4, representing deviations of focal points of light of different wavelengths converged after passing through the optical imaging lens assembly. FIG. 8B illustrates the astigmatic curve of the optical imaging lens assembly according to Embodiment 4, representing a curvature of the tangential image plane and a curvature of the sagittal image plane. FIG. 8C illustrates the distortion curve of the optical imaging lens assembly according to Embodiment. 4, representing amounts of distortion at different viewing angles. FIG. 8D illustrates the lateral color curve of the optical imaging lens assembly according to Embodiment 4, representing deviations of different image heights on the image plane after light passes through the optical imaging lens assembly. It can be seen from FIGS. 8A-8D that the optical imaging lens assembly according to Embodiment 4 can achieve a good imaging quality.

Embodiment 5

An optical imaging lens assembly according to Embodiment 5 of the present disclosure is described below with reference to FIGS. 9-10D.

Figure 9:
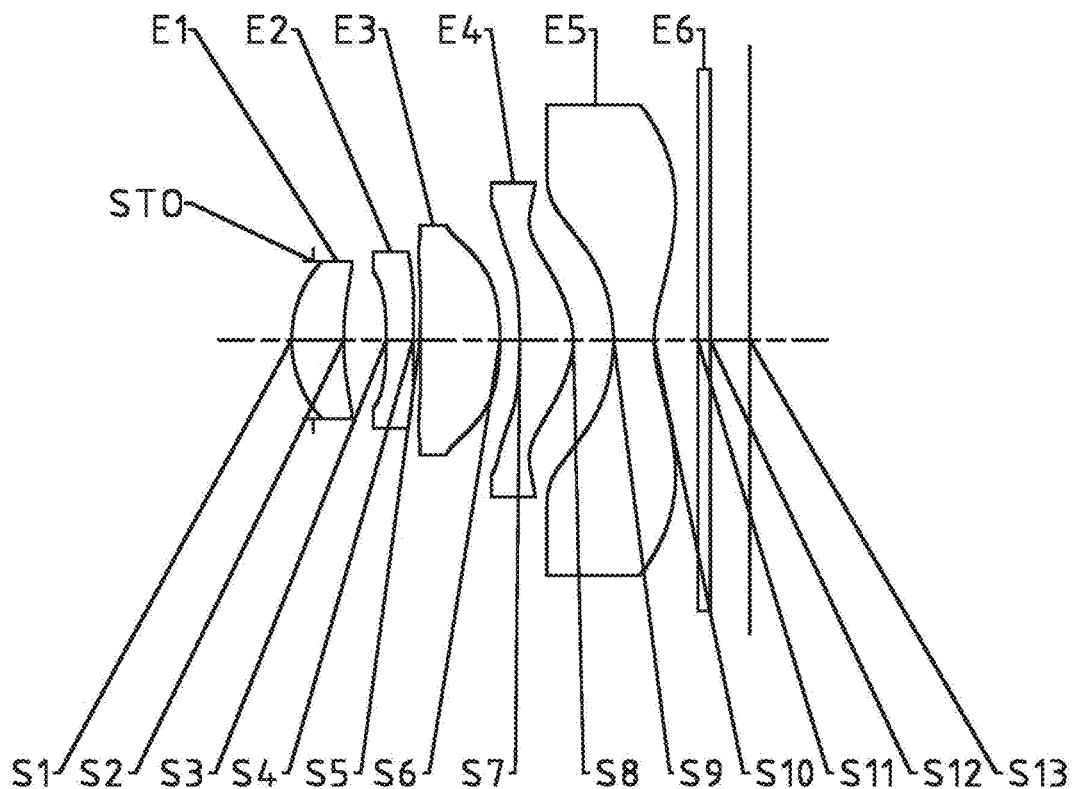
FIG. 9 is a schematic structural diagram illustrating an optical imaging lens assembly according to Embodiment 5 of the present disclosure.

FIG. 9 is a schematic structural diagram illustrating the optical imaging lens assembly according to Embodiment 5 of the present disclosure. As shown in FIG. 9, the optical imaging lens assembly according to Embodiment 5 includes first to fifth lenses E1-E5 respectively having an object-side surface and an image-side surface.

In this embodiment, the first lens E1 has a positive refractive power, and the object-side surface S1 of the first lens E1 is a convex surface. The second lens E2 has a negative refractive power, and the object-side surface S3 of the second lens E2 is a concave surface. The third lens E3 has a positive refractive power. The fourth lens E4 has a positive refractive power, and the image-side surface S8 of the fourth lens E4 is a convex surface. The fifth lens E5 has a negative refractive power, the object-side surface S9 of the fifth lens E5 is a concave surface, and the image-side surface S10 of the fifth lens E5 is a concave surface.

Table 13 below shows the surface type, the radius of curvature, the thickness, the material and the conic coefficient of each lens of the optical imaging lens assembly in Embodiment 5. Table 14 shows the high-order coefficients of each aspheric surface in Embodiment 5. Table 15 shows the effective focal lengths f1-f5 of the lenses in Embodiment 5, the effective focal length f of the optical imaging lens assembly, the half of the diagonal length ImgH of the effective pixel area of the electronic photosensitive element of the optical imaging lens assembly, and the distance TTL on the optical axis from the object-side surface S1 or the first lens E1 to the image plane S13 of the optical imaging lens assembly. The surface type of each aspheric surface may be defined by the formula (1) given in Embodiment 1.

TABLE 13

| surface number | surface type | radius of curvature | thickness | material | | conic coefficient |
|---|---|---|---|---|---|---|
| | | | | refractive index | abbe number | |
| OBJ | spherical | infinite | infinite | | | |
| STO | spherical | infinite | −0.1906 | | | |
| S1 | aspheric | 1.4178 | 0.4644 | 1.55 | 56.1 | 0.5304 |
| S2 | aspheric | 3.4725 | 0.3790 | | | −54.3590 |
| S3 | aspheric | −6.7613 | 0.2400 | 1.67 | 20.4 | 32.6711 |
| S4 | aspheric | 13.5276 | 0.0604 | | | −99.0000 |
| S5 | aspheric | 16.8509 | 0.7120 | 1.55 | 56.1 | 8.4301 |
| S6 | aspheric | −2.5950 | 0.1763 | | | 0.4708 |
| S7 | aspheric | −4.6398 | 0.4743 | 1.55 | 56.1 | 9.3461 |
| S8 | aspheric | −0.9596 | 0.3596 | | | −3.8617 |
| S9 | aspheric | −1.8171 | 0.3570 | 1.55 | 56.1 | −0.0700 |
| S10 | aspheric | 1.3967 | 0.3893 | | | −2.5293 |
| S11 | spherical | infinite | 0.1100 | 1.52 | 64.2 | |
| S12 | spherical | infinite | 0.3548 | | | |
| S13 | spherical | infinite | | | | |

TABLE 14

| surface number | A4 | A6 | A8 | A10 | A12 |
|---|---|---|---|---|---|
| S1 | −4.0744E−02 | 6.6405E−01 | −5.8135E+00 | 3.0974E+01 | −1.0373E+02 |
| S2 | 1.7698E−01 | −2.8759E−01 | −8.7077E−01 | 1.4187E+01 | −7.9571E+01 |
| S3 | −2.0442E−01 | −2.0544E−01 | −1.0966E+00 | 2.2093E+01 | −1.3996E+02 |

TABLE 14-continued

| | | | | | |
|---|---|---|---|---|---|
| S4 | 8.8700E−03 | −1.8524E+00 | 9.7330E+00 | −2.9595E+01 | 5.6336E+01 |
| S5 | 1.4032E−01 | −1.9979E+00 | 8.5963E+00 | −2.2680E+01 | 3.8477E+01 |
| S6 | 7.6611E−02 | −6.5097E−01 | 5.6294E−01 | 2.9859E−01 | −9.0601E−01 |
| S7 | 1.8690E−01 | −3.7776E−01 | −6.7705E−01 | 2.3708E+00 | −2.5870E+00 |
| S8 | 2.2595E−02 | 6.7838E−02 | −6.6096E−01 | 1.2246E+00 | −1.0055E+00 |
| S9 | 2.4740E−01 | −9.4729E−01 | 1.7101E+00 | −1.7900E+00 | 1.1564E+00 |
| S10 | −2.9747E−01 | 2.7424E−01 | −1.7579E−01 | 7.7955E−02 | −2.4130E−02 |

| surface number | A14 | A16 | A18 | A20 |
|---|---|---|---|---|
| S1 | 2.2003E+02 | −2.8711E+02 | 2.1040E+02 | −6.6444E+01 |
| S2 | 2.4174E+02 | −4.1981E+02 | 3.8932E+02 | −1.5023E+02 |
| S3 | 4.5252E+02 | −8.1994E+02 | 7.9138E+02 | −3.1960E+02 |
| S4 | −6.6480E+01 | 4.6678E+01 | −1.7604E+01 | 2.6892E+00 |
| S5 | −4.1220E+01 | 2.6898E+01 | −9.7690E+00 | 1.5157E+00 |
| S6 | 6.2542E−01 | −1.4173E−01 | 0.0000E+00 | 0.0000E+00 |
| S7 | 1.4088E+00 | −3.8337E−01 | 3.6517E−02 | 1.9884E−03 |
| S8 | 4.4832E−01 | −1.1386E−01 | 1.5611E−02 | −9.0278E−04 |
| S9 | −4.6183E−01 | 1.1115E−01 | −1.4825E−02 | 8.4552E−04 |
| S10 | 5.1328E−03 | −7.1335E−04 | 5.7985E−05 | −2.0765E−06 |

TABLE 15

| f1(mm) | 4.06 | f(mm) | 3.02 |
|---|---|---|---|
| f2(mm) | −6.72 | TTL(mm) | 4.08 |
| f3(mm) | 4.17 | ImgH(mm) | 3.01 |
| f4(mm) | 2.12 | | |
| f5(mm) | −1.39 | | |

Figures 10A, 10B:
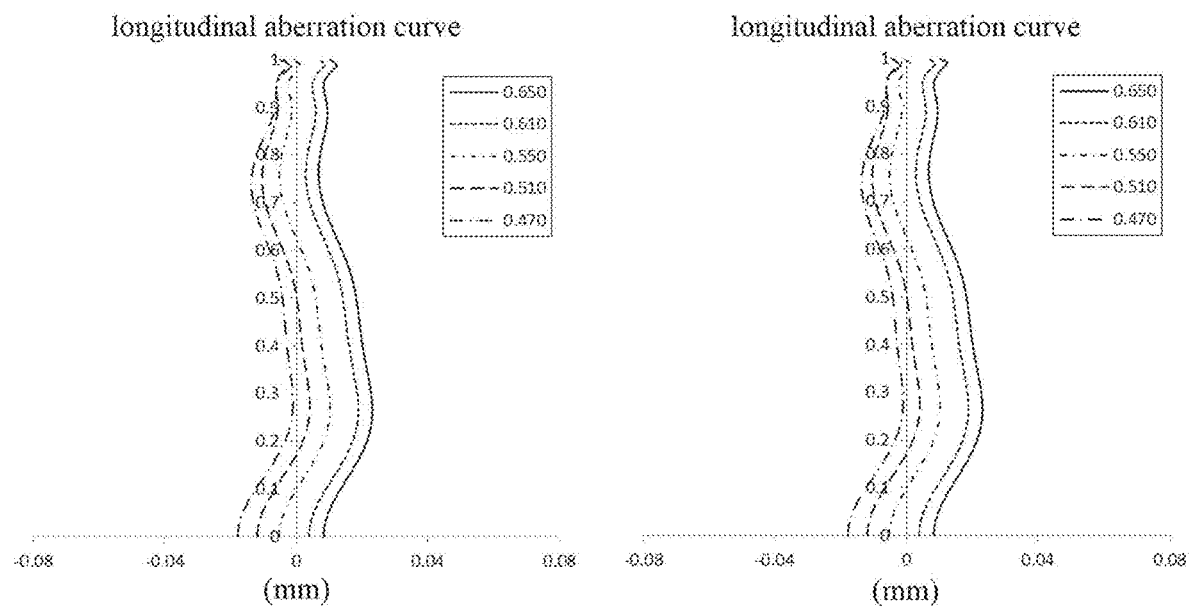
FIGS. 10A-10D respectively illustrate a longitudinal aberration curve, an astigmatic curve, a distortion curve, and a lateral color curve of the optical imaging lens assembly according to Embodiment 5.
Figures 10C, 10D:
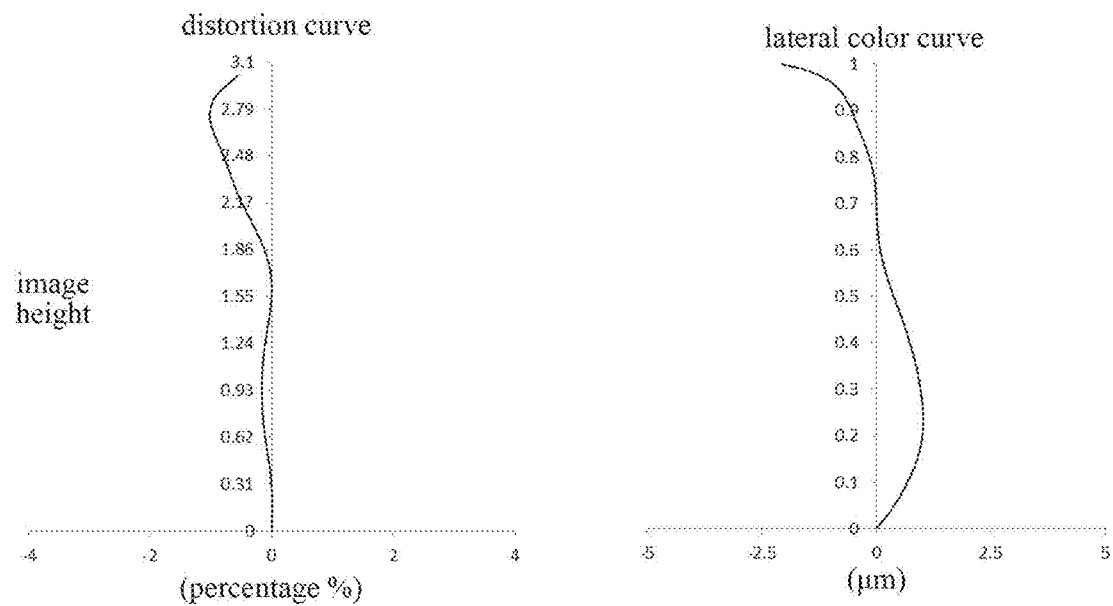

FIG. 10A illustrates the longitudinal aberration curve of the optical imaging lens assembly according to Embodiment 5, representing deviations of focal points of light of different wavelengths converged after passing through the optical imaging lens assembly. FIG. 10B illustrates the astigmatic curve of the optical imaging lens assembly according to Embodiment 5, representing a curvature of the tangential image plane and a curvature of the sagittal image plane. FIG. 10C illustrates the distortion curve of the optical imaging lens assembly according to Embodiment 5, representing amounts of distortion at different viewing angles. FIG. 10D illustrates the lateral color curve of the optical imaging lens assembly according to Embodiment 5, representing deviations of different image heights on the image plane after light passes through the optical imaging lens assembly. It can be seen from FIGS. 10A-10D that the optical imaging lens assembly according to Embodiment 5 can achieve a good imaging quality.

Embodiment 6

An optical imaging lens assembly according to Embodiment 6 of the present disclosure is described below with reference to FIGS. 11-12D.

Figure 11:
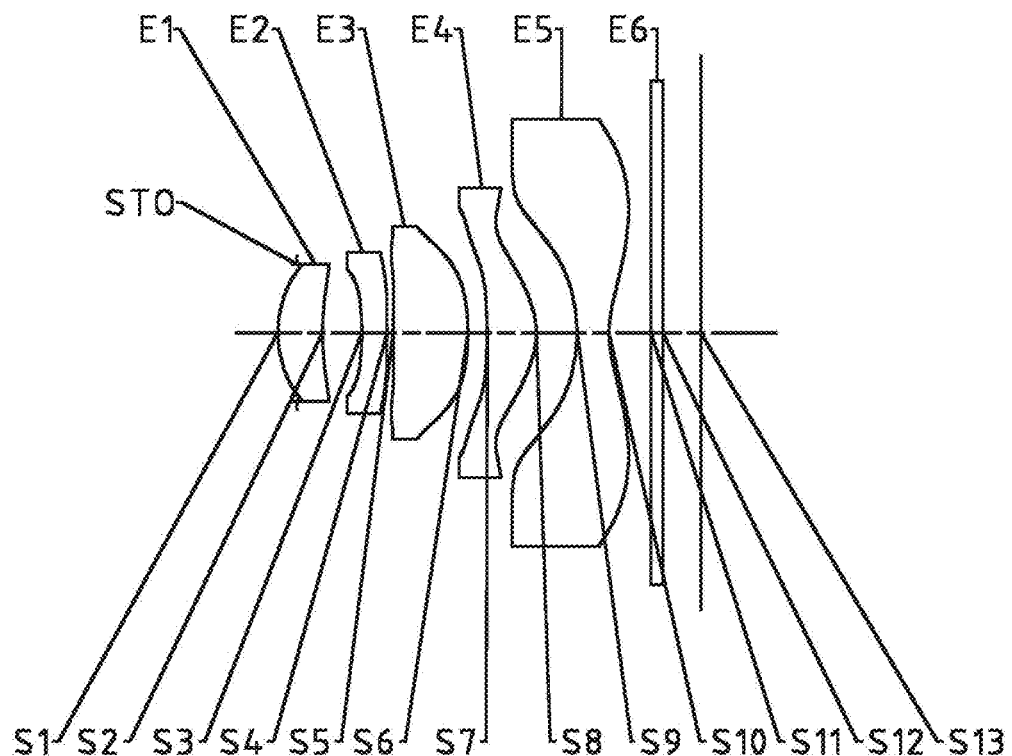
FIG. 11 is a schematic structural diagram illustrating an optical imaging lens assembly according to Embodiment 6 of the present disclosure.

FIG. 11 is a schematic structural diagram illustrating the optical imaging lens assembly according to Embodiment 6 of the present disclosure. As shown in FIG. 11, the optical imaging lens assembly according to Embodiment 6 includes first to fifth lenses E1-E5 respectively having an object-side surface and an image-side surface.

In this embodiment, the first lens E1 has a positive refractive power, and the object-side surface S1 of the first lens E1 is a convex surface. The second lens E2 has a negative refractive power, and the object-side surface S3 of the second lens E2 is a concave surface. The third lens E3 has a positive refractive power. The fourth lens E4 has a positive refractive power, and the image-side surface S8 of the fourth lens E4 is a convex surface. The fifth lens E5 has a negative refractive power, the object-side surface S9 of the fifth lens E5 is a concave surface, and the image-side surface S10 of the fifth lens E5 is a concave surface.

Table 16 below shows the surface type, the radius of curvature, the thickness, the material and the conic coefficient of each lens of the optical imaging lens assembly in Embodiment 6. Table 17 shows the high-order coefficients of each aspheric surface in Embodiment 6. Table 18 shows the effective focal lengths f1-f5 of the lenses in Embodiment 6, the effective focal length f of the optical imaging lens assembly, the half of the diagonal length ImgH of the effective pixel area of the electronic photosensitive element of the optical imaging lens assembly, and the distance TTL on the optical axis from the object-side surface S1 of the first lens E1 to the image plane S13 of the optical imaging lens assembly. The surface type of each aspheric surface may be defined by the formula (1) given in Embodiment 1.

TABLE 16

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.1816 | | | |
| S1 | aspheric | 1.3944 | 0.4238 | 1.55 | 56.1 | 0.5068 |
| S2 | aspheric | 3.4578 | 0.3731 | | | −67.0297 |
| S3 | aspheric | −4.5919 | 0.2400 | 1.67 | 20.4 | 34.2470 |
| S4 | aspheric | infinite | 0.0578 | | | −50.5000 |
| S5 | aspheric | 23.8057 | 0.7091 | 1.55 | 56.1 | 48.1764 |
| S6 | aspheric | −2.5574 | 0.1831 | | | 0.7139 |
| S7 | aspheric | −4.5184 | 0.4658 | 1.55 | 56.1 | 9.4036 |
| S8 | aspheric | −0.9562 | 0.3870 | | | −3.9188 |
| S9 | aspheric | −1.8128 | 0.3008 | 1.55 | 56.1 | −0.0707 |
| S10 | aspheric | 1.3703 | 0.3990 | | | −2.4990 |
| S11 | spherical | infinite | 0.1100 | 1.52 | 64.2 | |
| S12 | spherical | infinite | 0.3638 | | | |
| S13 | spherical | infinite | | | | |

TABLE 17

| surface number | A4 | A6 | A8 | A10 | A12 |
|---|---|---|---|---|---|
| S1 | −2.8577E−02 | 5.5611E−01 | −5.2625E+00 | 3.0213E+01 | −1.0811E+02 |
| S2 | 2.1131E−01 | −5.2761E−01 | 3.6905E−01 | 9.0052E+00 | −7.1873E+01 |
| S3 | −1.9985E−01 | −4.2155E−02 | −1.0958E+00 | 9.9352E+00 | −4.3212E+01 |
| S4 | 8.6491E−03 | −1.8027E+00 | 9.4105E+00 | −2.9826E+01 | 6.1307E+01 |
| S5 | 1.4731E−01 | −1.9525E+00 | 8.2934E+00 | −2.2293E+01 | 3.9263E+01 |
| S6 | 6.9896E−02 | −6.2367E−01 | 4.8006E−01 | 4.4120E−01 | −1.0821E+00 |
| S7 | 1.7268E−01 | −3.4982E−01 | −6.5699E−01 | 2.1349E+00 | −2.0979E+00 |
| S8 | −5.2021E−03 | 1.8134E−01 | −8.9732E−01 | 1.5275E+00 | −1.2409E+00 |
| S9 | 2.3782E−01 | −9.1092E−01 | 1.6269E+00 | −1.6855E+00 | 1.0765E+00 |
| S10 | −3.1280E−01 | 2.9106E−01 | −1.8857E−01 | 8.4367E−02 | −2.6291E−02 |

| surface number | A14 | A16 | A18 | A20 |
|---|---|---|---|---|
| S1 | 2.4208E+02 | −3.2948E+02 | 2.4876E+02 | −8.0307E+01 |
| S2 | 2.6662E+02 | −5.4991E+02 | 5.9959E+02 | −2.7139E+02 |
| S3 | 8.7781E+01 | −6.0371E+01 | −5.3316E+01 | 7.2490E+01 |
| S4 | −7.9695E+01 | 6.3056E+01 | −2.7908E+01 | 5.4045E+00 |
| S5 | −4.3932E+01 | 2.9980E+01 | −1.1389E+01 | 1.8493E+00 |
| S6 | 7.4790E−01 | −1.7421E−01 | 0.0000E+00 | 0.0000E+00 |
| S7 | 9.0844E−01 | −9.8361E−02 | −5.0848E−02 | 1.3304E−02 |
| S8 | 5.5917E−01 | −1.4507E−01 | 2.0515E−02 | −1.2395E−03 |
| S9 | −4.2363E−01 | 1.0009E−01 | −1.3058E−02 | 7.2616E−04 |
| S10 | 5.6290E−03 | −7.8905E−04 | 6.4922E−05 | −2.3622E−06 |

TABLE 18

| f1(mm) | 3.99 | f(mm) | 2.99 |
|---|---|---|---|
| f2(mm) | −6.88 | TTL(mm) | 4.01 |
| f3(mm) | 4.27 | ImgH(mm) | 3.01 |
| f4(mm) | 2.12 | | |
| f5(mm) | −1.38 | | |

Figure 12A:
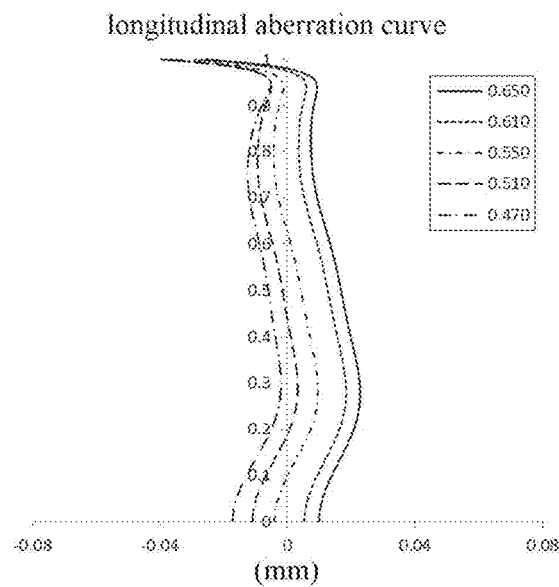
FIGS. 12A-12D respectively illustrate a longitudinal aberration curve, an astigmatic curve, a distortion curve, and a lateral color curve of the optical imaging lens assembly according to Embodiment 6.
Figure 12B:
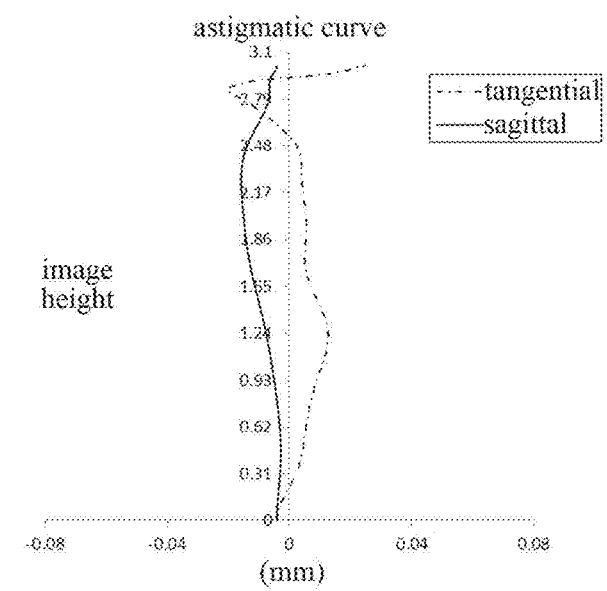
Figure 12C:
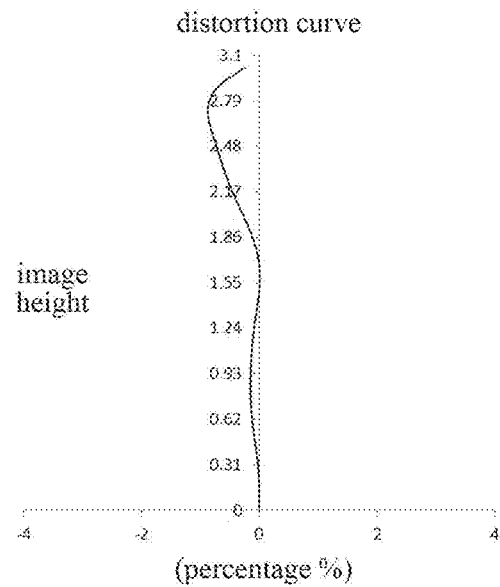
Figure 12D:
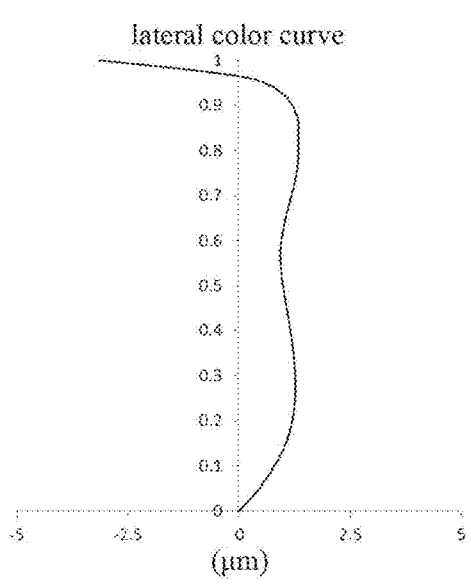

FIG. 12A illustrates the longitudinal aberration curve of the optical imaging lens assembly according to Embodiment 6, representing deviations of focal points of light of different wavelengths converged after passing through the optical imaging lens assembly. FIG. 12B illustrates the astigmatic curve of the optical imaging lens assembly according to Embodiment 6, representing a curvature of the tangential image plane and a curvature of the sagittal image plane. FIG. 12C illustrates the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of different image heights on the image plane after light passes through the optical imaging lens assembly. It can be seen from FIGS. 12A-12D that the optical imaging lens assembly according to Embodiment 6 can achieve a good imaging quality.

Embodiment 7

An optical imaging lens assembly according to Embodiment 7 of the present disclosure is described below with reference to FIGS. 13-14D.

Figure 13:
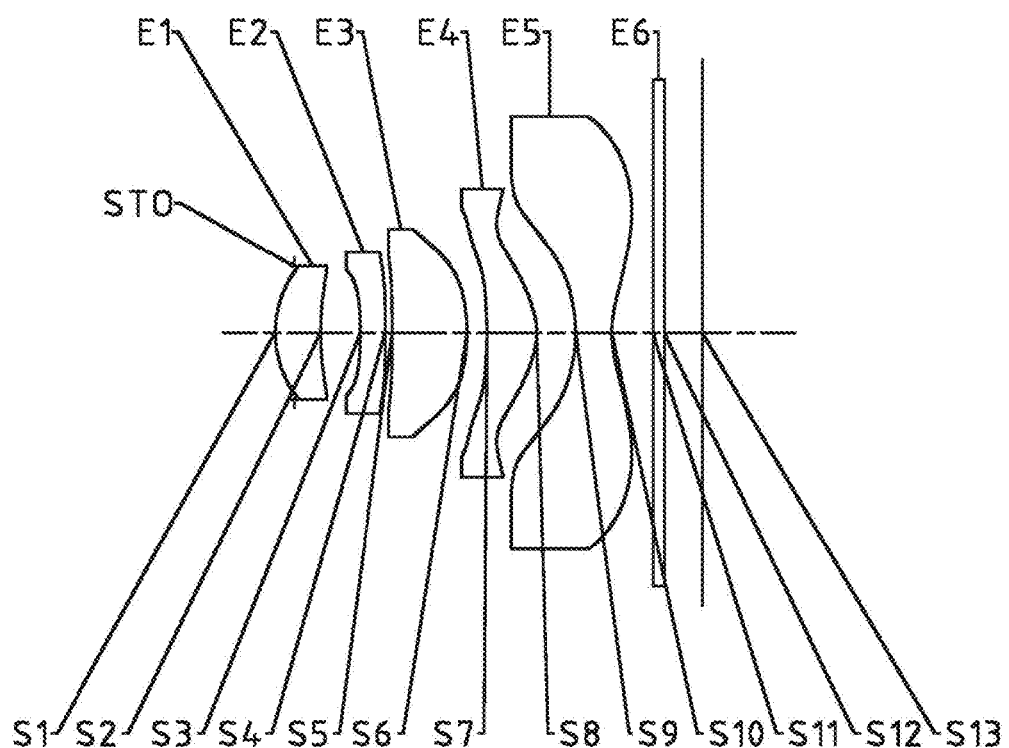
FIG. 13 is a schematic structural diagram illustrating an optical imaging lens assembly according to Embodiment 7 of the present disclosure.

FIG. 13 is a schematic structural diagram illustrating the optical imaging lens assembly according to Embodiment 7 of the present disclosure. As shown in FIG. 13, the optical imaging lens assembly according to Embodiment 7 includes first to fifth lenses E1-E5 respectively having an object-side surface and an image-side surface.

In this embodiment, the first lens E1 has a positive refractive power, and the object-side surface S1 of the first lens E1 is a convex surface. The second lens E2 has a negative refractive power, and the object-side surface S3 of the second lens E2 is a concave surface. The third lens E3 has a positive refractive power. The fourth lens E4 has a positive refractive power, and the image-side surface S8 of the fourth lens E4 is a convex surface. The fifth lens E5 has a negative refractive power, the object-side surface S9 of the fifth lens E5 is a concave surface, and the image-side surface S10 of the fifth lens E5 is a concave surface.

Table 19 below shows the surface type, the radius of curvature, the thickness, the material and the conic coefficient of each lens of the optical imaging lens assembly in Embodiment 7. Table 20 shows the high-order coefficients of each aspheric surface in Embodiment 7. Table 21 shows the effective focal lengths f1-f5 of the lenses in Embodiment 7, the effective focal length f of the optical imaging lens assembly, the half of the diagonal length ImgH of the effective pixel area of the electronic photosensitive element of the optical imaging lens assembly, and the distance TTL on the optical axis from the object-side surface S1 of the first lens E1 to the image plane S13 of the optical imaging lens assembly. The surface type of each aspheric surface may be defined by the formula (1) given in Embodiment 1.

TABLE 19

| surface number | surface type | radius of curvature | thickness | material refractive index | material abbe number | conic coefficient |
|---|---|---|---|---|---|---|
| OBJ | spherical | infinite | infinite | | | |
| STO | spherical | infinite | −0.1827 | | | |
| S1 | aspheric | 1.4056 | 0.4287 | 1.55 | 56.1 | 0.5329 |
| S2 | aspheric | 3.5973 | 0.3787 | | | −67.8417 |
| S3 | aspheric | −5.6493 | 0.2400 | 1.67 | 20.4 | 39.6268 |
| S4 | aspheric | 28.6692 | 0.0663 | | | 79.6637 |
| S5 | aspheric | infinite | 0.7100 | 1.55 | 56.1 | 99.0000 |
| S6 | aspheric | −2.3780 | 0.1906 | | | 0.8019 |
| S7 | aspheric | −4.5722 | 0.4697 | 1.55 | 56.1 | 9.3459 |
| S8 | aspheric | −0.9578 | 0.3696 | | | −3.9959 |
| S9 | aspheric | −1.8136 | 0.3398 | 1.55 | 56.1 | −0.0698 |
| S10 | aspheric | 1.3753 | 0.3938 | | | −2.5417 |
| S11 | spherical | infinite | 0.1100 | 1.52 | 64.2 | |
| S12 | spherical | infinite | 0.3594 | | | |
| S13 | spherical | infinite | | | | |

TABLE 20

| surface number | A4 | A6 | A8 | A10 | A12 |
|---|---|---|---|---|---|
| S1 | −3.1461E−02 | 6.2191E−01 | −5.8479E+00 | 3.3199E+01 | −1.1723E+02 |
| S2 | 1.9245E−01 | −3.8999E−01 | −6.4027E−01 | 1.4954E+01 | −9.3745E+01 |
| S3 | −2.1945E−01 | 8.9703E−02 | −2.9893E+00 | 2.4536E+01 | −1.1703E+02 |
| S4 | −1.3835E−02 | −1.4291E+00 | 7.3427E+00 | −2.3093E+01 | 4.7066E+01 |
| S5 | 1.2637E−01 | −1.7406E+00 | 7.4193E+00 | −2.0513E+01 | 3.7355E+01 |
| S6 | 5.9016E−02 | −5.8087E−01 | 4.0162E−01 | 5.1855E−01 | −1.0927E+00 |
| S7 | 1.6915E−01 | −2.6477E−01 | −9.1663E−01 | 2.5985E+00 | −2.6114E+00 |
| S8 | −1.2094E−04 | 1.8637E−01 | −9.2169E−01 | 1.5468E+00 | −1.2420E+00 |
| S9 | 2.4561E−01 | −9.3615E−01 | 1.6840E+00 | −1.7554E+00 | 1.1276E+00 |
| S10 | −3.0660E−01 | 2.8577E−01 | −1.8491E−01 | 8.2619E−02 | −2.5807E−02 |

| surface number | A14 | A16 | A18 | A20 |
|---|---|---|---|---|
| S1 | 2.5907E+02 | −3.4825E+02 | 2.6008E+02 | −8.3102E+01 |
| S2 | 3.1411E+02 | −6.0414E+02 | 6.2320E+02 | −2.6858E+02 |
| S3 | 3.2417E+02 | −5.2664E+02 | 4.6163E+02 | −1.7116E+02 |
| S4 | −6.0288E+01 | 4.6683E+01 | −2.0091E+01 | 3.7605E+00 |
| S5 | −4.2868E+01 | 2.9704E+01 | −1.1361E+01 | 1.8453E+00 |
| S6 | 7.1350E−01 | −1.5879E−01 | 0.0000E+00 | 0.0000E+00 |
| S7 | 1.2674E+00 | −2.5628E−01 | −9.8423E−03 | 8.4397E−03 |
| S8 | 5.5358E−01 | −1.4195E−01 | 1.9783E−02 | −1.1716E−03 |
| S9 | −4.4706E−01 | 1.0665E−01 | −1.4081E−02 | 7.9432E−04 |
| S10 | 5.5585E−03 | −7.8538E−04 | 6.5123E−05 | −2.3858E−06 |

TABLE 21

| f1(mm) | 3.95 | f(mm) | 3.01 |
|---|---|---|---|
| f2(mm) | −7.06 | TTL(mm) | 4.06 |
| f3(mm) | 4.35 | ImgH(mm) | 3.01 |
| f4(mm) | 2.12 | | |
| f5(mm) | −1.38 | | |

Figures 14A, 14B:
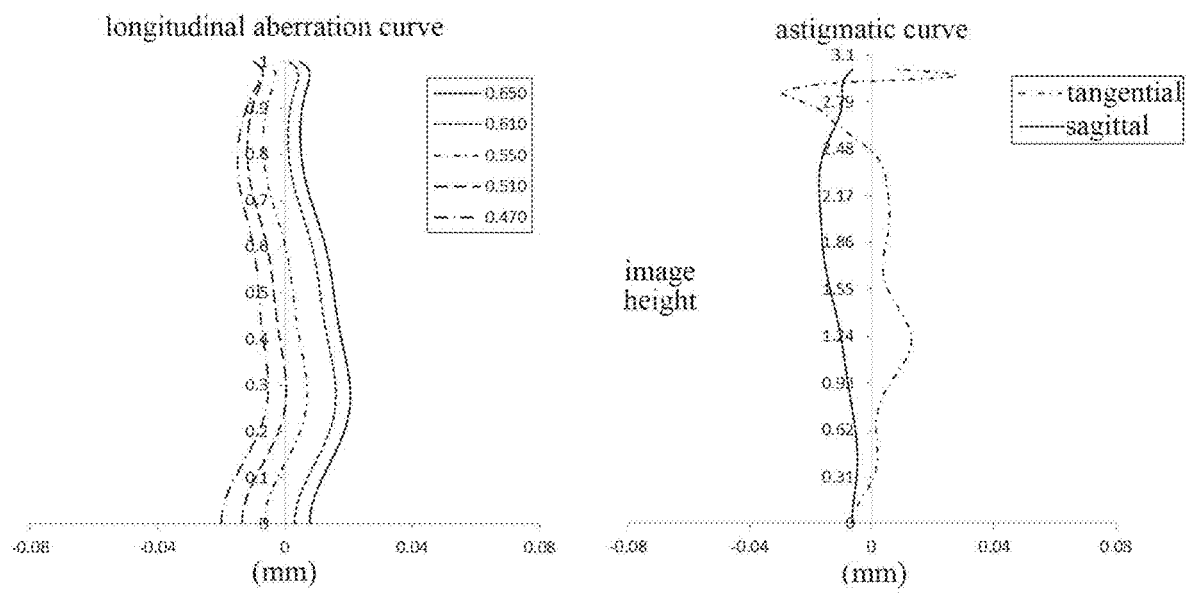
FIGS. 14A-14D respectively illustrate a longitudinal aberration curve, an astigmatic curve, a distortion curve, and a lateral color curve of the optical imaging lens assembly according to Embodiment 7.
Figures 14C, 14D:
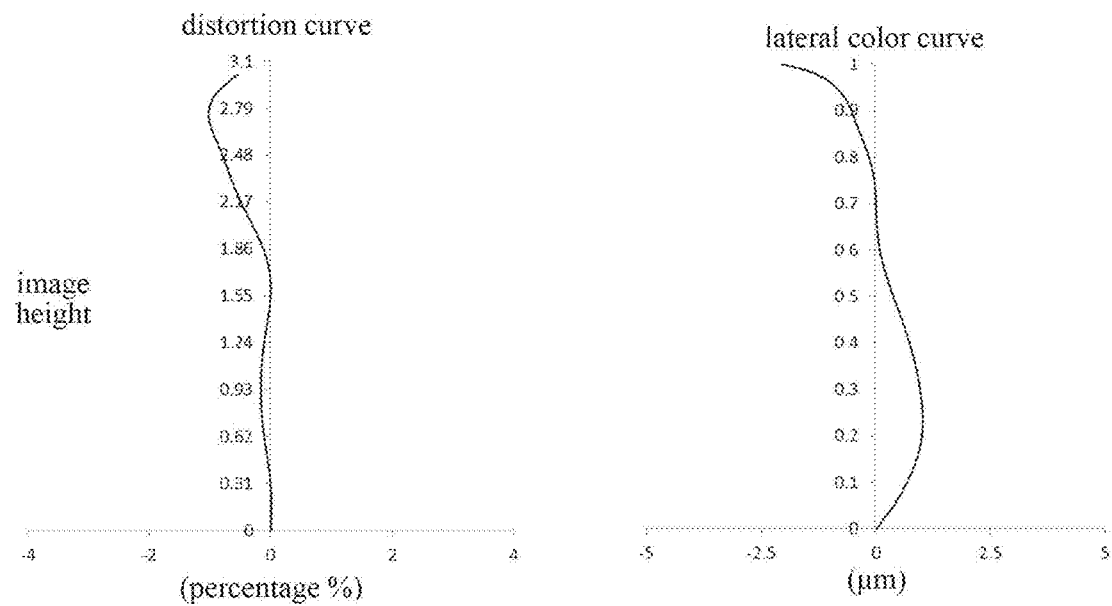

FIG. 14A illustrates the longitudinal aberration curve of the optical imaging lens assembly according to Embodiment 7, representing deviations of focal points of light of different wavelengths converged after passing through the optical imaging lens assembly. FIG. 14B illustrates the astigmatic curve of the optical imaging lens assembly according to Embodiment 7, representing a curvature of the tangential image plane and a curvature of the sagittal image plane. FIG. 14C illustrates the distortion curve of the optical imaging lens assembly according to Embodiment 7, representing amounts of distortion at different viewing angles. FIG. 14D illustrates the lateral color curve of the optical imaging lens assembly according to Embodiment 7, representing deviations of different image heights on the image plane after light passes through the optical imaging lens assembly. It can be seen from FIGS. 14A-14D that the optical imaging lens assembly according to Embodiment 7 can achieve a good imaging quality.

Embodiment 8

An optical imaging lens assembly according to Embodiment 8 of the present disclosure is described below with reference to FIGS. 15-16D.

Figure 15:
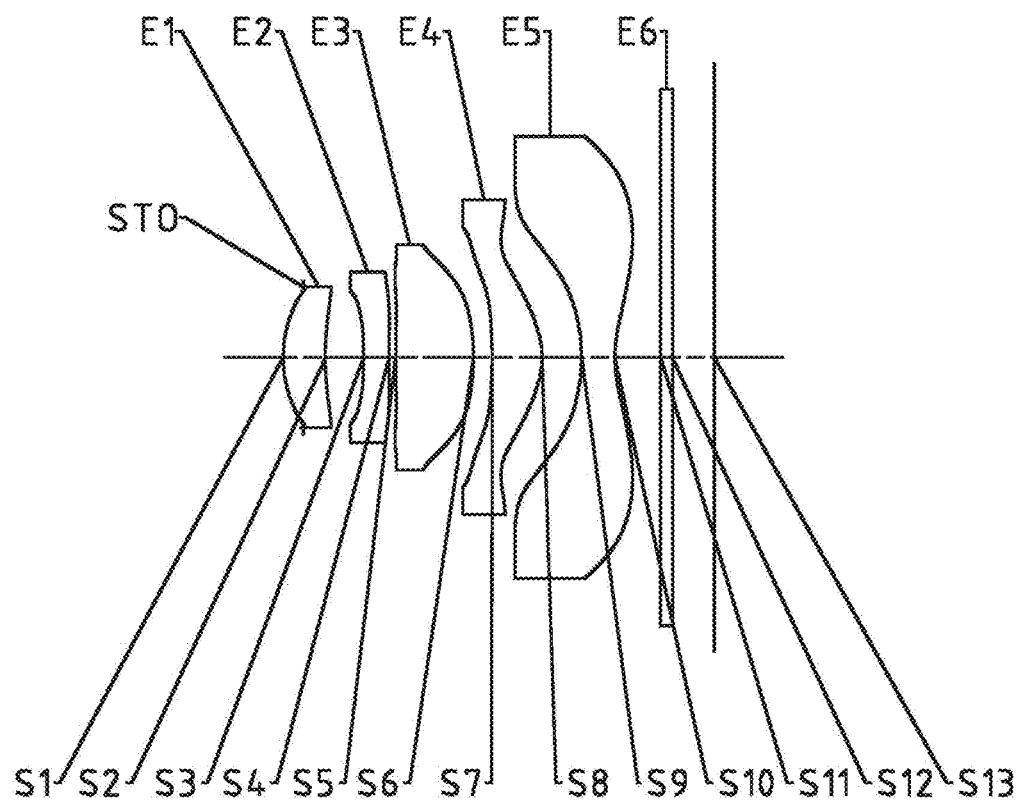
FIG. 15 is a schematic structural diagram illustrating an optical imaging lens assembly according to Embodiment 8 of the present disclosure.

FIG. 15 is a schematic structural diagram illustrating the optical imaging lens assembly according to Embodiment 8 of the present disclosure. As shown in FIG. 15, the optical imaging lens assembly according to Embodiment 8 includes first to fifth lenses E1-E5 respectively having an object-side surface and an image-side surface.

In this embodiment, the first lens E1 has a positive refractive power, and the object-side surface S1 of the first lens E1 is a convex surface. The second lens E2 has a negative refractive power, and the object-side surface S3 of the second lens E2 is a concave surface. The third lens E3 has a positive refractive power. The fourth lens E4 has a positive refractive power, and the image-side surface S8 of the fourth lens E4 is a convex surface. The fifth lens E5 has a negative refractive power, the object-side surface S9 of the fifth lens E5 is a concave surface, and the image-side surface S10 of the fifth lens E5 is a concave surface.

Table 22 below shows the surface type, the radius of curvature, the thickness, the material and the conic coefficient of each lens of the optical imaging lens assembly in Embodiment 8. Table 23 shows the high-order coefficients of each aspheric surface in Embodiment 8. Table 24 shows the effective focal lengths f1-f5 of the lenses in Embodiment 8, the effective focal length f of the optical imaging lens assembly, the half of the diagonal length ImgH of the effective pixel area of the electronic photosensitive element of the optical imaging lens assembly, and the distance TTL on the optical axis from the object-side surface S1 or the first lens E1 to the image plane S13 of the optical imaging lens assembly. The surface type of each aspheric surface may be defined by the formula. (1) given in Embodiment 1.

TABLE 22

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.1522 | | | |
| S1 | aspheric | 1.4040 | 0.4343 | 1.55 | 56.1 | 0.5058 |
| S2 | aspheric | 3.5658 | 0.3748 | | | −67.3095 |
| S3 | aspheric | −5.6609 | 0.2400 | 1.67 | 20.4 | 37.0012 |
| S4 | aspheric | 13.2106 | 0.0453 | | | −98.8285 |
| S5 | aspheric | 13.1321 | 0.7111 | 1.55 | 56.1 | 14.7131 |
| S6 | aspheric | −2.5894 | 0.1899 | | | 0.6293 |
| S7 | aspheric | −4.5735 | 0.4722 | 1.55 | 56.1 | 9.3619 |
| S8 | aspheric | −0.9578 | 0.3683 | | | −3.9063 |
| S9 | aspheric | −1.8140 | 0.3609 | 1.55 | 56.1 | −0.0701 |
| S10 | aspheric | 1.3910 | 0.3888 | | | −2.5407 |
| S11 | spherical | infinite | 0.1100 | 1.52 | 64.2 | |
| S12 | spherical | infinite | 0.3543 | | | |
| S13 | spherical | infinite | | | | |

TABLE 23

| surface number | A4 | A6 | A8 | A10 | A12 |
|---|---|---|---|---|---|
| S1 | −3.3545E−02 | 6.6529E−01 | −6.5404E+00 | 3.8721E+01 | −1.4300E+02 |
| S2 | 1.9803E−01 | −5.1344E−01 | 1.0177E+00 | 1.2197E+00 | −2.3197E+01 |
| S3 | −2.0563E−01 | −1.7914E−01 | −1.1521E+00 | 2.1717E+01 | −1.3871E+02 |
| S4 | 5.7313E−02 | −2.4396E+00 | 1.2964E+01 | −4.0159E+01 | 7.8451E+01 |
| S5 | 1.9586E−01 | −2.6403E+00 | 1.1828E+01 | −3.2167E+01 | 5.6115E+01 |
| S6 | 5.4494E−02 | −5.2604E−01 | 1.8217E−01 | 9.8320E−01 | −1.6430E+00 |
| S7 | 1.6378E−01 | −2.4127E−01 | −1.0351E+00 | 2.9261E+00 | −3.1476E+00 |
| S8 | 8.0324E−03 | 1.2328E−01 | −7.7270E−01 | 1.3664E+00 | −1.1141E+00 |
| S9 | 2.4903E−01 | −9.6102E−01 | 1.7356E+00 | −1.8135E+00 | 1.1681E+00 |
| S10 | −2.9569E−01 | 2.6810E−01 | −1.6853E−01 | 7.3235E−02 | −2.2284E−02 |

| surface number | A14 | A16 | A18 | A20 |
|---|---|---|---|---|
| S1 | 3.3217E+02 | −4.7224E+02 | 3.7555E+02 | −1.2842E+02 |
| S2 | 8.9325E+01 | −1.7295E+02 | 1.6845E+02 | −6.6191E+01 |
| S3 | 4.5258E+02 | −8.2632E+02 | 7.9994E+02 | −3.2274E+02 |
| S4 | −9.6254E+01 | 7.1626E+01 | −2.9507E+01 | 5.1923E+00 |
| S5 | −6.2101E+01 | 4.2085E+01 | −1.5941E+01 | 2.5874E+00 |
| S6 | 1.0519E+00 | −2.4146E−01 | 0.0000E+00 | 0.0000E+00 |
| S7 | 1.7749E+00 | −5.2869E−01 | 6.7257E−02 | −5.1452E−04 |
| S8 | 4.9791E−01 | −1.2718E−01 | 1.7580E−02 | −1.0290E−03 |
| S9 | −4.6467E−01 | 1.1132E−01 | −1.4769E−02 | 8.3754E−04 |
| S10 | 4.6829E−03 | −6.4647E−04 | 5.2442E−05 | −1.8807E−06 |

TABLE 24

| f1(mm) | 3.96 | f(mm) | 3.01 |
|---|---|---|---|
| f2(mm) | −5.91 | TTL(mm) | 4.05 |
| f3(mm) | 4.02 | ImgH(mm) | 3.01 |
| f4(mm) | 2.12 | | |
| f5(mm) | −1.39 | | |

Figure 16A:
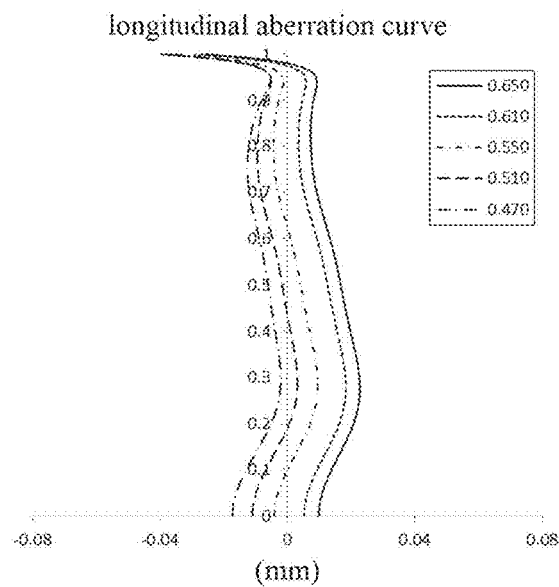
FIGS. 16A-16D respectively illustrate a longitudinal aberration curve, an astigmatic curve, a distortion curve, and a lateral color curve of the optical imaging lens assembly according to Embodiment 8.
Figure 16B:
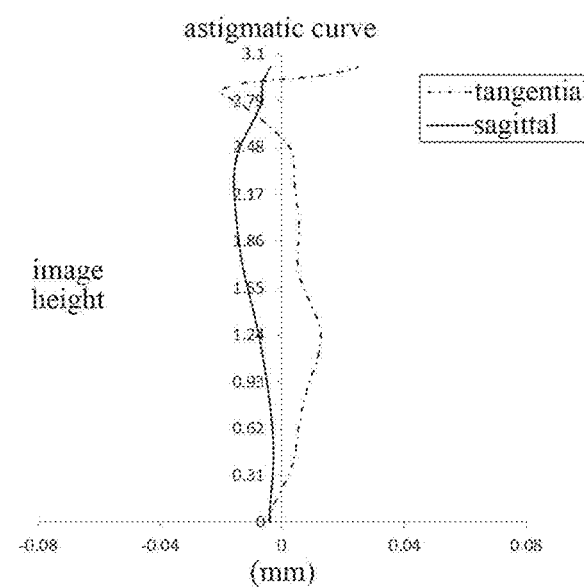
Figure 16C:
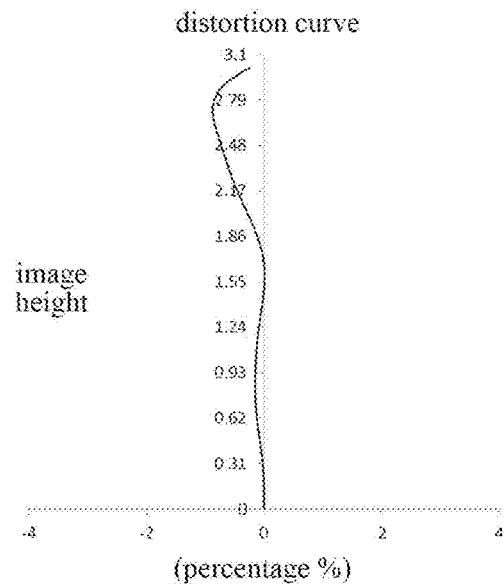
Figure 16D:
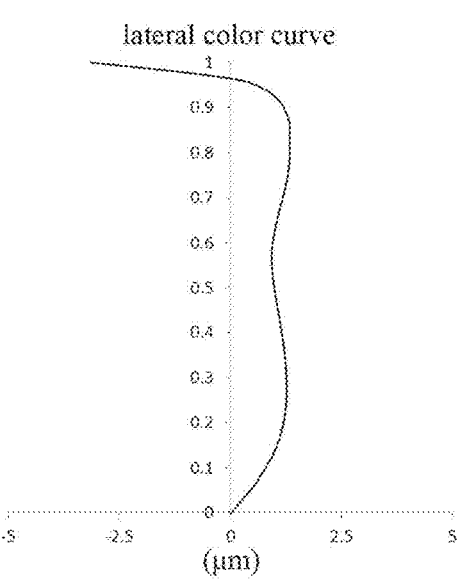

FIG. 16A illustrates the longitudinal aberration curve of the optical imaging lens assembly according to Embodiment 8, representing deviations of focal points of light of different wavelengths converged after passing through the optical imaging lens assembly. FIG. 16B illustrates the astigmatic curve of the optical imaging lens assembly according to Embodiment 8, representing a curvature of the tangential image plane and a curvature of the sagittal image plane. FIG. 16C illustrates the distortion curve of the optical imaging lens assembly according to Embodiment 8, representing amounts of distortion at different viewing angles. FIG. 16D illustrates the lateral color curve of the optical imaging lens assembly according to Embodiment 8, representing deviations of different image heights on the image plane after light passes through the optical imaging lens assembly. It can be seen from FIGS. 16A-16D that the optical imaging lens assembly according to Embodiment 8 can achieve a good imaging quality.

To sum up, Embodiments 1-8 respectively satisfy the relationships shown in Table 25 below.

TABLE 25

| Conditional | Embodiment | | | | | | | |
|---|---|---|---|---|---|---|---|---|
| Expression | 1 | 2 | 3 | 4 | 5 | 6 | 7 | 8 |
| HFOV | 45.5 | 45.4 | 46.6 | 46.0 | 45.0 | 45.2 | 45.0 | 45.2 |
| CT3/CT4 | 1.50 | 1.52 | 1.50 | 1.50 | 1.50 | 1.52 | 1.51 | 1.51 |
| R10/R9 | −0.85 | −0.78 | −0.79 | −0.80 | −0.77 | −0.76 | −0.76 | −0.77 |
| f1/CT1 | 9.59 | 8.52 | 10.03 | 10.66 | 8.75 | 9.41 | 9.22 | 9.11 |
| f4/f | 0.77 | 0.71 | 0.72 | 0.73 | 0.70 | 0.71 | 0.71 | 0.70 |
| R9/CT5 | −6.04 | −5.26 | −5.04 | −5.51 | −5.09 | −6.03 | −5.34 | −5.03 |
| β52 | 57.00 | 37.60 | 55.20 | 56.50 | 43.60 | 30.60 | 55.50 | 46.40 |
| f4/CT4 | 4.71 | 4.51 | 4.48 | 4.39 | 4.47 | 4.56 | 4.52 | 4.49 |
| |R6/R5| | 0.21 | 0.20 | 0.24 | 0.25 | 0.15 | 0.11 | 0 | 0.20 |
| f4/f5 | −1.50 | −1.52 | −1.50 | −1.47 | −1.52 | −1.54 | −1.54 | −1.53 |
| f1/R1 | 1.82 | 2.81 | 2.86 | 2.91 | 2.87 | 2.86 | 2.81 | 2.82 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed is the present disclosure with (but not limited to) technical features with similar functions.

What is claimed is:

1. An optical imaging lens assembly comprising, sequentially along an optical axis from an object side to an image side, a first lens, a second lens, a third lens, a fourth lens, and a fifth lens, wherein the first lens has a positive refractive power, and an object-side surface of the first lens is a convex surface;

the second lens has a positive refractive power or a negative refractive power, and an object-side surface of the second lens is a concave surface;

the third lens has a positive refractive power or a negative refractive power;

the fourth lens has a positive refractive power, and an image-side surface of the fourth lens is a convex surface;

the fifth lens has a negative refractive power, and an object-side surface of the fifth lens and an image-side surface of the fifth lens are concave surfaces;

a center thickness CT3 of the third lens on the optical axis and a center thickness CT4 of the fourth lens on the optical axis satisfy: CT3/CT4≥1.5; and a radius of curvature R9 of the object-side surface of the fifth lens and a center thickness CT5 of the fifth lens on the optical axis satisfy: −7<R9/CT5≤−5.

2. The optical imaging lens assembly according to claim 1, wherein half of a maximal field-of-view HFOV of the optical imaging lens assembly satisfies: HFOV≥45°.

3. The optical imaging lens assembly according to claim 1, wherein the radius of curvature R9 of the object-side surface of the fifth lens and a radius of curvature R10 of the image-side surface of the fifth lens satisfy: −0.9<R10/R9<−0.7.

4. The optical imaging lens assembly according to claim 1, wherein an effective focal length f1 of the first lens and a center thickness CT1 of the first lens on the optical axis satisfy: 8.0<f1/CT1<11.0.

5. The optical imaging lens assembly according to claim 4, wherein the effective focal length f1 of the first lens and a radius of curvature R1 of the object-side surface of the first lens satisfy: 1.0<f1/R1<4.0.

6. The optical imaging lens assembly according to claim 1, wherein an effective focal length f of the optical imaging lens assembly and an effective focal length f4 of the fourth lens satisfy: 0.6≤f4/f<0.8.

7. The optical imaging lens assembly according to claim 6, wherein the effective focal length f4 of the fourth lens and the center thickness CT4 of the fourth lens on the optical axis satisfy: 4.0<f4/CT4<5.0.

8. The optical imaging lens assembly according to claim 7, wherein the effective focal length f4 of the fourth lens and an effective focal length f5 of the fifth lens satisfy: −1.6<f4/f5<−1.4.

9. The optical imaging lens assembly according to claim 1, wherein a radius of curvature R5 of an object-side surface of the third lens and a radius of curvature R6 of an image-side surface of the third lens satisfy: 0<|R6/R5|<0.5.

10. An optical imaging lens assembly comprising, sequentially along an optical axis from an object side to an image side, a first lens, a second lens, a third lens, a fourth lens, and a fifth lens, wherein each of the first lens and the fourth lens has a positive refractive power;

at least one of the second lens, the third lens, or the fifth lens has a negative refractive power;

half of a maximal field-of-view HFOV of the optical imaging lens assembly satisfies: HFOV≥45°;

a center thickness CT3 of the third lens on the optical axis and a center thickness CT4 of the fourth lens on the optical axis satisfy: CT3/CT4≥1.5; and a radius of curvature R9 of an object-side surface of the fifth lens and a center thickness CT5 of the fifth lens on the optical axis satisfy: −7<R9/CT5≤−5.

11. The optical imaging lens assembly according to claim 10, wherein the radius of curvature R9 of the object-side surface of the fifth lens and a radius of curvature R10 of an image-side surface of the fifth lens satisfy: −0.9<R10/R9<−0.7.

12. The optical imaging lens assembly according to claim 10, wherein an effective focal length f1 of the first lens and a center thickness CT1 of the first lens on the optical axis satisfy: 8.0<f1/CT1<11.0.

13. The optical imaging lens assembly according to claim 12, wherein the effective focal length f1 of the first lens and a radius of curvature R1 of an object-side surface of the first lens satisfy: 1.0<f1/R1<4.0.

14. The optical imaging lens assembly according to claim 12, wherein an effective focal length f of the optical imaging lens assembly and an effective focal length f4 of the fourth lens satisfy: 0.6≤f4/f<0.8.

15. The optical imaging lens assembly according to claim 14, wherein the effective focal length f4 of the fourth lens and the center thickness CT4 of the fourth lens on the optical axis satisfy: 4.0<f4/CT4<5.0.

16. The optical imaging lens assembly according to claim 15, wherein the effective focal length f4 of the fourth lens and an effective focal length f5 of the fifth lens satisfy: −1.6<f4/f5<−1.4.

\* \* \* \* \*